(12) United States Patent
Beneton et al.

(10) Patent No.: US 6,729,456 B2
(45) Date of Patent: May 4, 2004

(54) CLUTCH ASSEMBLY AND METHODS OF ASSEMBLING AND OPERATING THE SAME

(75) Inventors: Sebastien Beneton, Hoenheim (FR); Christopher Raber, Ottweiler-Steinbach (DE); Rolf Meinhard, Bühl (DE); Reinhard Berger, Bühl (DE)

(73) Assignee: LUK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/259,247

(22) Filed: Sep. 27, 2002

(65) Prior Publication Data

US 2003/0106767 A1 Jun. 12, 2003

Related U.S. Application Data

(63) Continuation of application No. PCT/DE01/01362, filed on Apr. 4, 2001.

(30) Foreign Application Priority Data

Apr. 10, 2000 (DE) .......................................... 100 17 815

(51) Int. Cl.$^7$ ............................................... F16D 13/75
(52) U.S. Cl. .................. 192/48.8; 192/48.4; 192/70.25; 192/111 A
(58) Field of Search ................................ 192/48.5, 48.1, 192/48.8, 48.9, 70.25, 111 A, 48.4

(56) References Cited

U.S. PATENT DOCUMENTS

| | | | |
|---|---|---|---|
| 6,276,504 B1 | * | 8/2001 | Tscheplak et al. .......... 192/48.8 |
| 6,390,265 B1 | * | 5/2002 | Weydmann ................ 192/48.8 |
| 6,457,572 B1 | * | 10/2002 | Dau et al. ................ 192/48.91 |
| 6,533,094 B2 | * | 3/2003 | Uehara et al. ........... 192/70.25 |

* cited by examiner

*Primary Examiner*—Saul Rodriguez
(74) *Attorney, Agent, or Firm*—Henry M. Feiereisen

(57) ABSTRACT

First and second automatically operable friction clutches in the power train of a motor vehicle are connected between a rotary output element of the prime mover and first and second input elements of a change-speed gearbox. The wear upon the friction linings on the clutch disc of one of the clutches is frequently different from the wear upon the friction linings on the clutch disc of the other clutch. This is compensated for by automatically ascertaining the extent of wear upon the friction linings of the two clutches and by carrying out remedial undertakings such as temporarily reducing or interrupting the wear upon the friction linings which were subjected to more pronounced wear and/or increasing the wear upon the other friction linings.

100 Claims, 7 Drawing Sheets

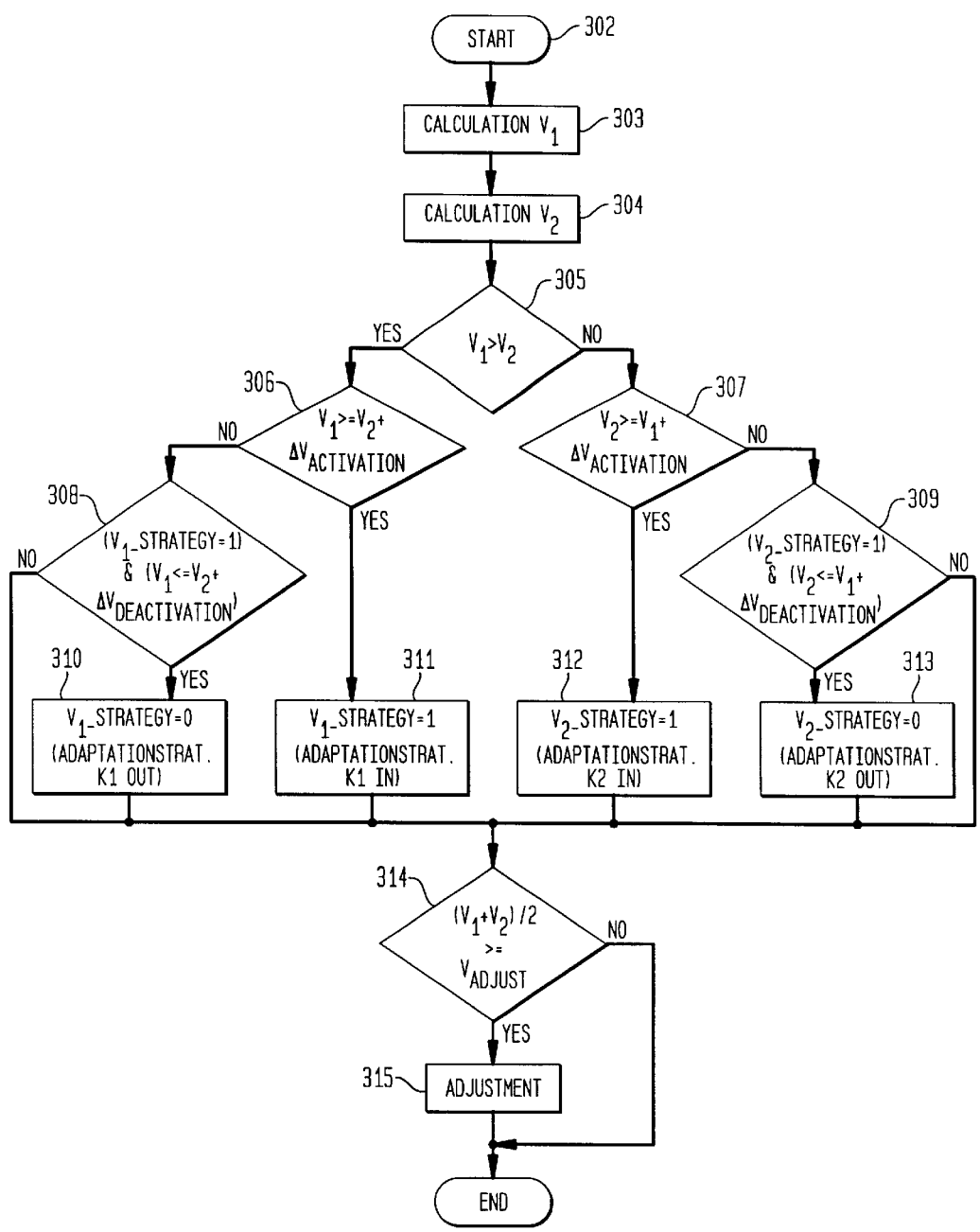

CLUTCH ASSEMBLY AND METHODS OF ASSEMBLING AND OPERATING THE SAME

CROSS-REFERENCE TO RELATED CASES

This application is a continuation of PCT/DE01/01362, filed Apr. 4, 2001 which claims the priorities of the commonly owned German patent application Serial No. 100 14 815.4 (filed Apr. 10, 2000) and of the commonly owned International patent application Serial No. PCT/DE01/01362 (filed Apr. 4, 2001). The disclosures of the priority applications, as well as that of each US and/or foreign patent and/or patent application identified in the specification of the present application, are incorporated herein by reference.

BACKGROUND OF THE INVENTION

The present invention relates to clutches in general, and more particularly to improvements in clutch assemblies which can be utilized with advantage in the power trains of motor vehicles to transmit torque between a prime mover (such as an internal combustion engine, an electric motor or a hybrid drive) and a gearbox or transmission. Still more particularly, the invention relates to improvements in clutch assemblies which receive torque from the rotary output element of a prime mover (e.g., from the crankshaft or from the camshaft of an internal combustion engine) and can be operated to transmit torque to discrete first and second rotary input elements (e.g., to coaxial first and second shafts) of a gearbox.

The invention also relates to methods of assembling and operating clutch assemblies of the above outlined character.

It is already known to transmit torque between the prime mover of a motor vehicle and the gearbox in the power train of the vehicle by resorting to two friction clutches. Each clutch can be actuated by the operator of the vehicle by way of a discrete pedal or automatically by way of a control unit. A drawback of conventional arrangements of such character is that the operating point of a friction clutch is shifted in response to wear in actual use of the friction clutches; this necessitates a change in the magnitude of the actuating force which must be applied in order to engage or disengage the clutches. This exerts a negative influence upon the operation of the clutches as well as upon their actuation.

OBJECTS OF THE INVENTION

An object of the instant invention is to provide a novel and improved multiple clutch assembly which can be utilized with particular advantage in the power trains of motor vehicles.

Another object of the present invention is to provide a clutch assembly wherein the clutches cooperate in a novel and improved manner.

A further object of this invention is to provide novel and improved friction clutches which can be utilized in the above outlined multiple clutch assembly.

An additional object of the invention is to provide a power train, particularly for use in motor vehicles, which employs a clutch assembly of the above outlined character.

Still another object of our invention is to provide a motor vehicle which embodies a power train employing the above outlined clutch assembly.

A further object of the present invention is to provide a relatively simple and inexpensive multiple clutch assembly which can be utilized as a superior substitute for presently known multiple clutch assemblies.

Another object of our invention is to provide a clutch assembly whose operation remains at least substantially unchanged during the useful life of the arrangement, such as the power train of a motor vehicle, wherein the clutch assembly is put to use.

An additional object of the invention is to provide a clutch assembly wherein the individual clutches can be engaged and disengaged in a highly reliable and unchanging manner during the entire useful life of the assembly.

Still another object of the present invention is to provide a novel and improved method of operating the above outlined clutch assembly.

A further object of the invention is to provide a method which renders it possible to automatically compensate for and to avoid the adverse effects of unequal wear upon the individual clutches of the above outlined clutch assembly.

Another object of the invention is to provide a clutch assembly which can be fully or practically fully assembled in the manufacturing plant rather than at the locale of installation into the power train of a motor vehicle or any other arrangement in which the clutch assembly is being put to use.

Still another object of the invention is to provide novel and improved controls for clutch assemblies of the above outlined character, for their clutches, for the prime movers which transmit torque to the clutches and/or for the devices (such as automatically shiftable gearboxes) which receive torque from the individual clutches of the clutch assembly.

A further object of the invention is to provide a novel and improved gearbox which can be combined with the above outlined clutch assembly.

SUMMARY OF THE INVENTION

One feature of the present invention resides in the provision of a clutch assembly which comprises a rotary input member connectable with a rotary output element of a prime mover (e.g., with the crankshaft or camshaft of an internal combustion engine in the power train of a motor vehicle), a housing which is rotatable with the input member, first and second input elements which are coaxial with the output element (such input elements can constitute interfitted input shafts of a change-speed transmission or gearbox in the power train of the motor vehicle), first and second clutch discs which are respectively rotatable with the first and second input elements and have first and second friction linings which are subject to wear in actual use of the clutch assembly, a first pressure plate which is connected with the output element (preferably by way of the input member), a first counterpressure plate connected with the housing in such a way that the first friction lining(s) is or are disposed between the first pressure plate and the first counterpressure plate, a second pressure plate which is rotatable with the housing, a second counterpressure plate rotatable: with the input member and installed in or relative to the housing in such a way that the second friction lining(s) is or are disposed between the second pressure plate and the second counterpressure plate (the second counterpressure plate is or can be installed in such a way that it is disposed between the second clutch disc and a portion of the housing), and adjusting means having means for compensating for wear upon at least one of the first and second friction linings (particularly for compensating for unequal wear upon the first and second friction linings).

The first counterpressure plate has or can have limited freedom of axial movement relative to the housing, and the second counterpressure plate has or can also have limited freedom of axial movement relative to the housing.

The first pressure plate, the first counterpressure plate and the first clutch disc constitute component parts of a first friction clutch which is or can be connected in parallel with a second friction clutch including the second pressure plate, the second counterpressure plate and the second clutch disc. Such clutch assembly preferably further includes automated means for actuating the first and second friction clutches, and the two friction clutches can form part of a twin clutch. The clutch assembly can further comprise first and second actuating means for the respective friction clutches. At least one of the actuating means can include a diaphragm spring (Belleville spring) or a membrane. If at least one of the actuating means includes a diaphragm spring, such spring is preferably arranged to normally maintain the respective friction clutch in at least partially engaged condition; the diaphragm spring is deformable to thus allow for disengagement of the respective friction clutch.

One of the actuating means can include a (first) portion which bears upon one of the counterpressure plates, and such clutch assembly can further comprise an annular distancing element which is interposed between a second portion of the one actuating means and the other actuating means, The first or second portion of the one actuating means is or can be more distant from the common axis of the friction clutches than the second or first portion of the one actuating means. The distancing element can include first and second ring-shaped portions having different diameters and respectively abutting the first and second actuating means of the clutch assembly. It is often desirable that the diameter of the first ring-shaped portion exceed the diameter of the second ring-shaped portion of the distancing element.

The second actuating means can include a first portion which bears upon the respective counterpressure plate, and the clutch assembly can further comprise a function element and an annular intermediate part which is interposed between the function element and a second portion of the second actuating means. The latter is tiltable relative to the intermediate part and the function element can include or constitute a diaphragm spring or a membrane.

At least one of the actuating means can comprise an elastically deformable annular base (such as a ring-shaped washer-like part) and actuating portions (such as prongs or tines) extending radially inwardly from the base.

The clutch assembly further comprises first and second drives which preferably engage the radially inner portions of the respective (first and second) actuating means. The actuating means have first sides which confront and second sides which face away from the respective clutch discs, and the drives are preferably adjacent the second sides of the respective actuating means.

The second actuating means has a first portion which bears upon the respective counterpressure plate and the aforementioned intermediate part is preferably interposed between the function element and a second portion of the second actuating means. The latter is tiltable relative to the intermediate part. The function element can comprise or constitute a diaphragm spring or a membrane having an axially fixed radially inner portion which abuts and is tiltable relative to the housing. Such clutch assembly preferably further comprises a fulcrum for the second actuating means and the fulcrum is installed between a radially outer portion of the function element and the second actuating means.

The function element can form part of the adjusting means and the latter is or can be arranged to ensure the application of at least substantially constant forces to the counterpressure plates through the medium of the first and second actuating elements.

A portion of the function element can constitute a bearing for the second actuating means and such bearing is movable axially of the output element in dependency upon the extent of wear upon at least one of the friction linings.

The aforementioned compensating means can include means for compensating for wear upon the first and second friction linings.

The aforementioned intermediate part can include or constitute an annulus which is interposed between the function element and a portion of the second actuating means. At least one of the actuating means is operable to generate a force which opposes a second (supporting) force generated in response to the bias of a bearing acting upon the second actuating means. The bearing can form part of the function element.

It is also within the purview of the present invention to configurate and install the actuating means in such a way that one thereof can generate a force developing in response to wear upon at least one of the friction linings. The force is applied to the function element and increases in response to increasing wear upon the friction linings. The just mentioned force exceeds an opposing force which is generated by the function element. The latter is deformable (such as elastic) so that it can yield when it is subjected to the action of a force being applied by one of the actuating means.

The actuating means can be arranged to apply to the function element a force which increases with increasing wear upon at least one of the friction linings; this results in movement of a portion of the function element in a direction toward the pressure plates. The just mentioned portion of the function element engages the aforementioned intermediate portion or part which is interposed between the function element and one of the actuating means. The force which the actuating means apply to the function element decreases in response to movement of the aforementioned portion of the function element toward the pressure plates. The movement of the aforesaid portion of the function element is terminated upon the establishment of an equilibrium of forces between the forces required for operation of at least one of the actuating means and an opposing force generated by the function element.

Each of the actuating means can have a predetermined range of operation and a downwardly sloping characteristic curve which slopes downwardly at least within a portion of the respective range.

The second actuating means can include a (first) portion which bears upon the respective counterpressure plate. The aforementioned preferably annular intermediate part is or can be interposed between the function element and a second portion of the second actuating means. The latter is tiltable relative to the intermediate part and the function element (e.g., a diaphragm spring or a membrane) can be arranged to store energy for the generation of a force which is at least substantially constant within the contemplated range of compensation for wear by the adjusting means.

The function element (which can constitute a membrane or a diaphragm spring) is or can be mounted to yield axially of the clutch assembly and can constitute a bearing for a portion of one of the actuating means; the bearing is stressed in a direction toward the housing of the clutch assembly.

The automatic wear compensating device of the clutch assembly can be installed between the housing and one of the actuating means. The wear compensating device can include a portion one side of which faces one of the actuating devices; such portion of the wear compensating device is movable axially of the output element toward the pressure plates and is arranged to be arrested against movement away from the pressure plates.

A portion of the wear compensating device can be interposed between the clutch housing and the first actuating means. Such portion of the wear compensating device can be arranged to adjust a spring-biased mobile resilient seat for one of the actuating means to an extent corresponding to the extent of movement of at least one of the actuating means as a result of wear upon at least one of the friction linings.

The wear compensating means can include a ring-shaped member which is urged by at least one of the actuating means axially of the output element, at least during absence of actuation of the respective friction clutch.

The aforementioned automatic wear compensating device can include at least one adjusting ramp which slopes in the axial direction of the output element. The at least one ramp can be provided on an annular member of the automatic wear compensating device; such annular member can be provided with or can carry an annular member. The automatic wear compensating device further comprises at least one second ramp which cooperates with the at least one adjusting ramp. The at least one second ramp can be provided on a ring which is disposed between the housing and the annular member. The at least one ramp can slope at an angle of between 5 and 20 degrees, preferably at an angle of between about 8 and 12 degrees. The ramps frictionally engage each other and have slopes at angles which prevent self-locking by friction. Means can be provided to bias the aforementioned ring toward the aforementioned annular member and/or vice versa.

The aforementioned automatic wear compensating device can act as a freewheel in the direction of disengagement of at least one of the friction clutches but the device is preferably self-locking in the opposite direction.

In a presently preferred embodiment of the improved clutch assembly, the automatic wear compensating device includes at least one mobile adjusting portion.

The automatic wear compensating device can be arranged to carry out wear compensation as a function of changes of RPM of at least one rotary part of the improved clutch assembly and/or to be deactivated at at least one predetermined speed of the at least one rotary part of the clutch assembly; such device can be blocked at rotational speeds of the at least one rotary part above 1000 RPM.

If the output element constitutes the output element (such as a camshaft or a crankshaft) of a prime mover (such as an internal combustion engine) in the power train of a motor vehicle, the automatic wear compensating device can be arranged to be operative at RPMs of the output element during idling and at RPMs below the idling RPM of the prime mover.

The arrangement can be such that the automatic wear compensating device is activatable at substantially zero RPM of a rotary part of the power train.

The automatic wear compensating device can include a first support for at least one first ramp, a second support for at least one second ramp which abuts and is movable relative to the first ramp (and/or vice versa) in the axial direction of the output element, and means (such as one or more coil springs, diaphragm springs or the like) for biasing one of the supports toward the other support. The biasing means can be arranged to turn the one support relative to the other support.

The aforementioned function element can constitute a bearing for one of the actuating means.

At least one of the friction linings can include a first section, a second section and resilient means between such sections. One of the sections can be frictionally engaged by the respective pressure plate, and the other section can be engaged by the respective counterpressure plate. The resilient means can have a distance-force characteristic which at least approximates the distance-force characteristic of the force being exerted by the first and second actuating means upon the respective pressure plates.

Another feature of the present invention resides in the provision of a method of actuating an assembly which comprises a plurality of clutch discs having friction linings which are subject to wear, for example, when utilized in the power train of a motor vehicle to transmit torque from a rotary output element (such as a camshaft or a crankshaft) of a prime mover (such as an internal combustion engine or a hybrid drive) to discrete input elements of a gearbox, and wherein the wear upon the friction linings is compensated for by adjusting means. The method comprises the steps of monitoring the extent of wear upon at least one of the friction linings, and influencing the extent of wear upon at least one of the friction linings when the monitored extent of wear exceeds a preselected value.

The influencing step can include altering the extent of wear upon at least one of the friction linings in order to ensure that the wear upon any one of the friction linings at least approximates the extent of wear upon each other friction lining.

The monitoring step can include at least representatively ascertaining the extent of wear upon the at least one friction lining. The ascertaining step can include determining the extent of wear upon each of the friction linings.

At least in many or most instances, the ascertaining step can include measuring the extent of wear upon the at least one friction lining.

The ascertaining step can also include calculating the extent of wear upon the at least one friction lining, and such calculating step can include determining the extent of wear upon the at least one friction lining on the basis of calculated energy input of the respective friction clutch. Each clutch includes a clutch disc which is disposed between a pressure plate and a counterpressure plate. At least one of the friction clutches is operable with slip in the partly engaged condition thereof, and the aforementioned energy input is a function of the RPM of the clutch including the at least one friction lining during operation with slip. The calculated energy input is or can be a function at least of friction torque of the respective friction clutch or at least of a coefficient of wear. The latter can be a function of temperature, such as the temperature of at least one of the friction clutches. This method can further comprise the step of monitoring the temperature of the at least one friction clutch, e.g., with a temperature model.

The calculating step of the improved method can include ascertaining the extent of wear upon the friction linings by way of statistical evaluation of parameters of characteristic curves. The parameters can pertain to the measuring points of the respective friction clutches. At least one of the parameters can pertain or relate to the maximum friction torque of one of the friction clutches.

Alternatively, at least one of the parameters can relate to the maximum actuating force of one of the friction clutches. The calculation of actuating force of at least one of the friction clutches is or can be dependent at least upon the maximal speed of an actuator for the at least one friction clutch. The maximum actuating force of the at least one friction clutch can depend at least upon the work of the actuator for the at least one friction clutch.

The arrangement can be such that the ascertaining step is not appreciably affected by short-lasting influences. The calculation of a new value is or can be effected iteratively on the basis of an actual value and a predetermined value with attendant weighting of the respective values. The calculation of a new value can involve an averaging of several previously ascertained values.

The method can further comprise the steps of comparing the values which serve as a basis for the calculating step with reference values, and utilizing the results of the comparing step to establish a function which is at least representative of the extent of wear upon at least one of the friction linings.

The influencing step of the improved method can include adjusting the clutch assembly of at least two friction clutches when the averaged values of individual values of the extent of wear upon the at least one friction lining reach a preselected value. Such method can further include the step of actualizing (if necessary) at least some of the reference values upon completion of the adjusting step and as a function of the characteristics of the friction clutch including the at least one friction lining.

The monitoring step of the method can include ascertaining the extent of wear upon each of the friction linings, and such method can further comprise the step of comparing the extents of wear upon the friction linings prior to the influencing step. Still further, such method can comprise the step of memorizing the results of the comparing step. Moreover, the said influencing step of such method can include altering the wear upon at least one of the friction linings when the comparing step indicates a predetermined difference between the extents of wear upon the friction linings.

The altering step of the just discussed method can include at least one of (a) increasing the extent of wear upon the friction lining which has undergone less wear, and (b) reducing the extent of wear upon the friction lining which has undergone more pronounced wear. If the friction clutches including discrete friction linings serve to transmit torque in the power train of a motor vehicle (such as between the rotary output element of the prime mover and discrete input shafts of a multispeed gearbox or transmission), the transmission of torque by the clutches is or can be varied in dependency upon the extent of wear to which the respective friction linings are subjected. Some speeds of the gearbox are associated with each of the friction clutches, and such method can further comprise the step of shifting the gearbox into a speed associated with that friction clutch which is to vary the transmission of torque in dependency upon the extent of wear upon the respective friction lining.

The output element of the prime mover in the power train which includes the just discussed clutch assembly is rotatable at a plurality of different speeds, and the method can include the additional step of increasing the extent of engagement of at least one of the friction clutches in response to increasing speed of the output element. Such additional step preferably includes increasing the extents of engagement of the friction clutches at different rates in response to increasing speed of the output element of the prime mover. The additional step can include increasing the extent of engagement of the at least one friction clutch at a rate which is dependent upon the position of a multiple-position load lever for the friction clutches with weighting factors corresponding to the extent of wear upon the friction linings.

The altering step of the method can further include at least temporarily operating with slip that one of the clutches the friction lining of which has undergone less pronounced wear, and disengaging that friction clutch the lining of which has undergone more pronounced wear.

The altering step of the improved method can further include at least temporarily operating with slip that one of the friction clutches the friction lining of which has undergone less pronounced wear and at least temporarily operating without slip that friction clutch the friction lining of which has undergone more pronounced wear.

It is also within the purview of the invention to resort to a method according to which the altering step further includes engaging that friction clutch the friction lining of which has undergone less pronounced wear, particularly during coasting of the motor vehicle. If the gearbox in the power train embodying the clutch assembly has a plurality of different speeds or ratios (e.g., five forward speeds, a neutral position and at least one reverse speed) some of which are associated with a first friction clutch and the others of which are associated with at least one second friction clutch, the influencing step can include shifting the gearbox into a higher speed associated with the clutch the friction lining of which has undergone less pronounced wear. Such method can include the additional step of increasing, in response to the application of a vehicle brake, the extent of torque transmission by that friction clutch the friction lining of which has undergone less pronounced wear.

A further feature of our present invention resides in the provision of a method of reducing the likelihood of damage to an automatically operable clutch assembly including a plurality of friction clutches with friction linings which undergo wear in actual use of the clutch assembly, particularly in the power train of a motor vehicle which further comprises means for compensating for wear upon the friction linings. The method comprises a first step of ascertaining the extent of wear upon the friction linings as a result of unintentional slip of the clutch (e.g., a slip which causes wear that adversely influences the useful life and/or the predictability of operation of the clutch assembly), and a second step of carrying out undertakings to at least reduce the extent of unintentional additional slip of the clutch, namely one of several clutches which constitute the clutch assembly.

The second step can include limiting the extent of energy input to the clutch assembly in response to unintentional slip of at least one of the friction clutches. Such limiting step can include throttling at least one of the variables including (a) the transmission of torque by the prime mover which is connected with the clutch assembly in the power train of a motor vehicle, and (b) the RPM of a rotary element of the prime mover.

Alternatively, or in addition to the aforediscussed undertakings, the limiting step can include limiting the extent of slip of the friction clutches which form part of the clutch assembly.

Still another feature of the present invention resides in the provision of a clutch assembly which comprises a rotary input member connectable with a rotary output element of a prime mover, a housing which is rotatable with the input member, first and second rotary input elements coaxial with the output element, and first and second friction clutches each of which includes a pressure plate, a counterpressure plate and a clutch disc disposed between the two plates and having friction linings which are subject to wear in actual use of the respective clutch. The clutch discs of the first and second friction clutches are respectively rotatable with the first and second input elements, the pressure plate of the first clutch is connected to the output element and the counterpressure plate of the first clutch is connected with the housing. The pressure plate of the second friction clutch is rotatable with the housing and the counterpressure plate of the second clutch is rotatable with the input member and is disposed between the clutch disc of the second clutch and the housing. The clutch assembly further comprises control means for automatically actuating the friction clutches and means for at least reducing the likelihood of damage to the friction clutches. Such likelihood reducing means includes means for compensating for wear upon at least one of the first and second friction linings.

The novel features which are considered as characteristic of the invention are set forth in particular in the appended claims. The iproved clutch assembly itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 2b is an enlarged view of a detail in the clutch assembly of FIG. 2a;

FIG. 3 is a block diagram representing the steps of a strategy to initiate remedial undertakings on the basis of the results of measurements of wear upon the friction linings of clutch discs in the discrete friction clutches of the clutch assembly;

DESCRIPTION OF PREFERRED EMBODIMENTS

Figure 1:
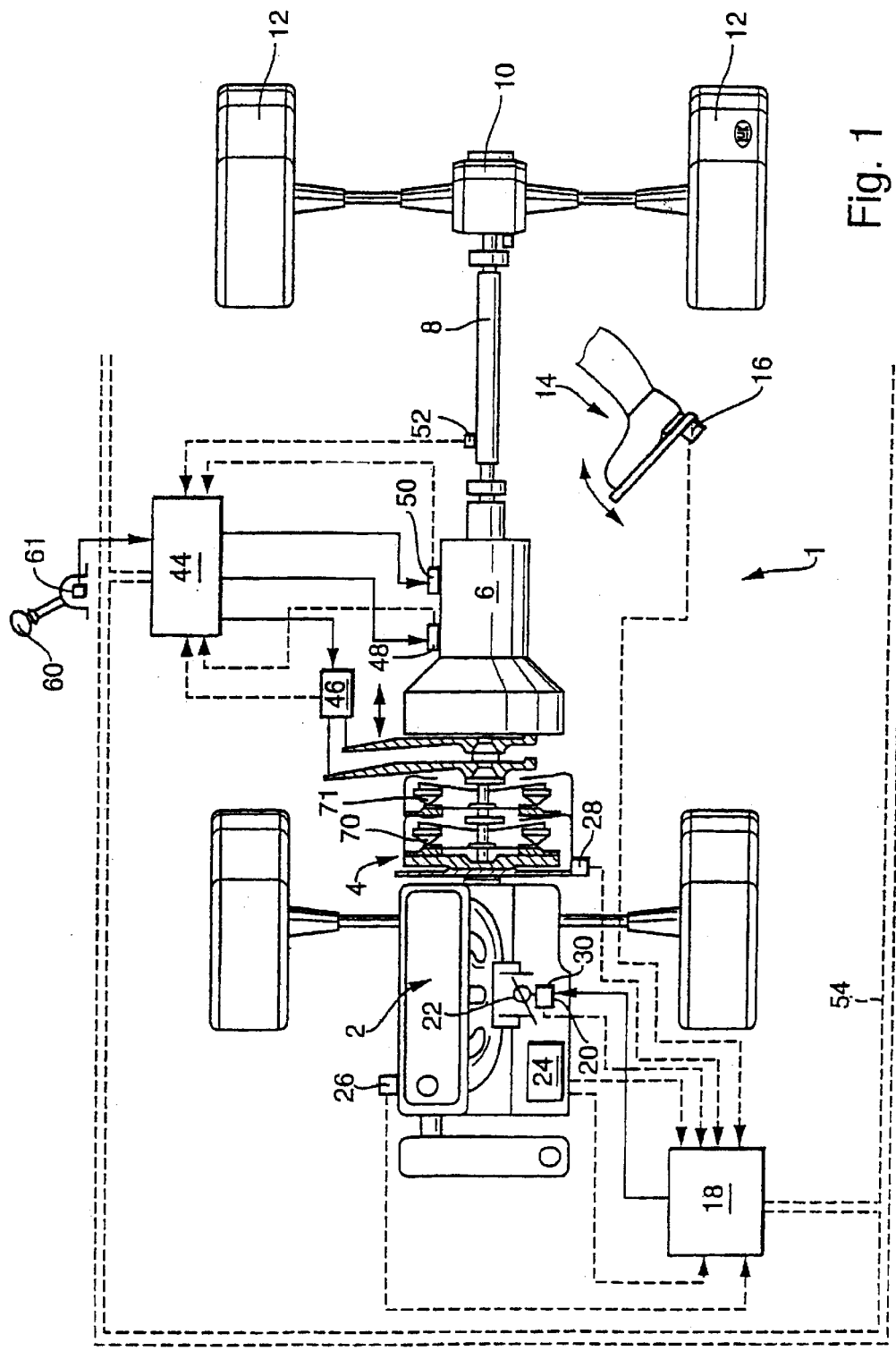
FIG. 1 is a partly schematic fragmentary plan view of a motor vehicle having a power train provided with a clutch assembly which embodies one form of the present invention.

FIG. 1 shows a portion of a motor vehicle 1 having a power train including a prime mover 2 (the illustrated prime mover is an internal combustion engine), a change-speed transmission or gearbox 6 (hereinafter called gearbox), a clutch assembly 4 which is interposed between the output element of the engine 2 and the input shafts of the gearbox, and a Cardan shaft 8 which receives torque from the gearbox and can drive a differential 10. The latter can rotate the wheels 12 of the motor vehicle. It will be appreciated that the illustrated motor vehicle with two driven wheels 12 is but one example of motor vehicles which can be equipped with a power train embodying the present invention.

The character 60 denotes a speed or gear shifting lever which cooperates with a sensor 61 to transmit appropriate signals to a composite control unit 18, 44. This control unit can be replaced with a one-piece control unit; it is then possible to omit a CAN-bus 54 which is utilized in the illustrated power train to transmit signals between the components 18 and 44 of the illustrated composite control unit. The bus 54 can can be replaced with any other suitable electrical connection capable of ensuring appropriate exchange of data between the components 18 and 44.

The control unit 18, 44 can be put to use to regulate automated operation of the gearbox 6 and/or of the discrete clutches 70 and 71 of the clutch assembly 4 and/or the prime mover 2. For example, the control unit 18, 44 can regulate the torque of the prime mover 2, the selection of the speed or ratio of the gearbox 6, the magnitude of the torque which can be transmitted by the individual clutch 70 and/or 71 and/or other operations of component parts of the power train. For example, the gearbox 6 can be of the type having several forward speeds, a reverse speed, a neutral position and a parking position.

The individual clutches 70, 71 are operable automatically, independently of each other, by an actuator system 46. This system can employ a single unit which is common to the two clutches, or it can comprise two discrete units, one for each of the clutches. The term "single unit" can denote a single structural unit or a single functional unit.

The arrangement which is employed to shift the gearbox 6 into selected speeds comprises, at the least, two gearbox actuating devices 48, 50 each of which is set up to select a set or group of speeds. Each such group or set is assigned to a different one of the two individual clutches 70, 71. It is presently preferred to arrange the two groups or sets in such a way that the speeds of each group form a series and that neighboring speeds are assigned to different ones of the clutches 70, 71. This enables the clutch assembly 4 to ensure or to facilitate a load shifting operation with alternating engagement of the clutches 70, 71 to thus generate a shifting with or without an interruption of the pulling or towing force.

The part 44 of the composite control unit 18, 44 renders it possible to select the speeds or ratios of the gearbox 6 in response to activation of the actuating device 48 or 50. For example, each of the devices 48, 50 can comprise two drives, one for the selection of a speed of the gearbox 6 and the other for shifting into the selected speed.

As already mentioned hereinbefore, the part 44 of the composite control unit 18, 44 can further effect an automatic operation of the clutch assembly 4 by way of the actator 46.

The part 44 of the control unit 18, 44 can receive signals which are at least indicative of settings (extents of engagement or disengagement) of the discrete clutches 70, 71 and of the momentary speed or ratio of the gearbox 6. Furthermore, the part 44 can receive signals from a sensor 52 which monitors the RPM of the rotary output element of the gearbox 6 (FIG. 1 illustrates that the aforesaid sensor 52 serves to monitor the RPM of the Cardan shaft 8). The signals denoting the settings of the clutches 70, 71 and/or other parameters are also furnished by suitable sensors, such as one or more sensors which furnish signals denoting the selected speed of the gearbox, one or more sensors which generate signals denoting the distances covered by selected parts of the individual clutches 70, 71, and so on.

The part 18 of the composite control unit 18, 44 transmits signals which control the operation of the engine 2 by selecting the setting of the throttle valve 30 and/or a fuel injection system. The inputs of the part 18 can receive signals from a sensor 26 which monitors the pressure in a suction pipe 24, from a sensor 28 which monitors the temperature of the cooling fluid, from a sensor 20 which monitors the RPM of a rotary part of the engine 2, from a sensor 22 serving to monitor the position of the throttle valve 30, and from a sensor 16 which monitors the position of the gas pedal 14. As already mentioned hereinbefore, the engine 2 is but one of the prime movers which can be utilized in a power train embodying the clutch assembly 4 and the gearbox 6.

Each of the gearbox actuating devices 48, 50 can comprise two electric motors one of which serves to select the speed of the gearbox 6 and the other of which serves to shift into a selected speed. To this end, each of the two electric motors forming part of the actuating device 48 or 50 can be set up to transmit motion to an associated mobile component which is part of the gearbox 6 and is movable along a predetermined path (such as a ratio or speed selecting path or a path along which the respective mobile component moves to actually shift the gearbox into a selected speed).

Figure 2A:
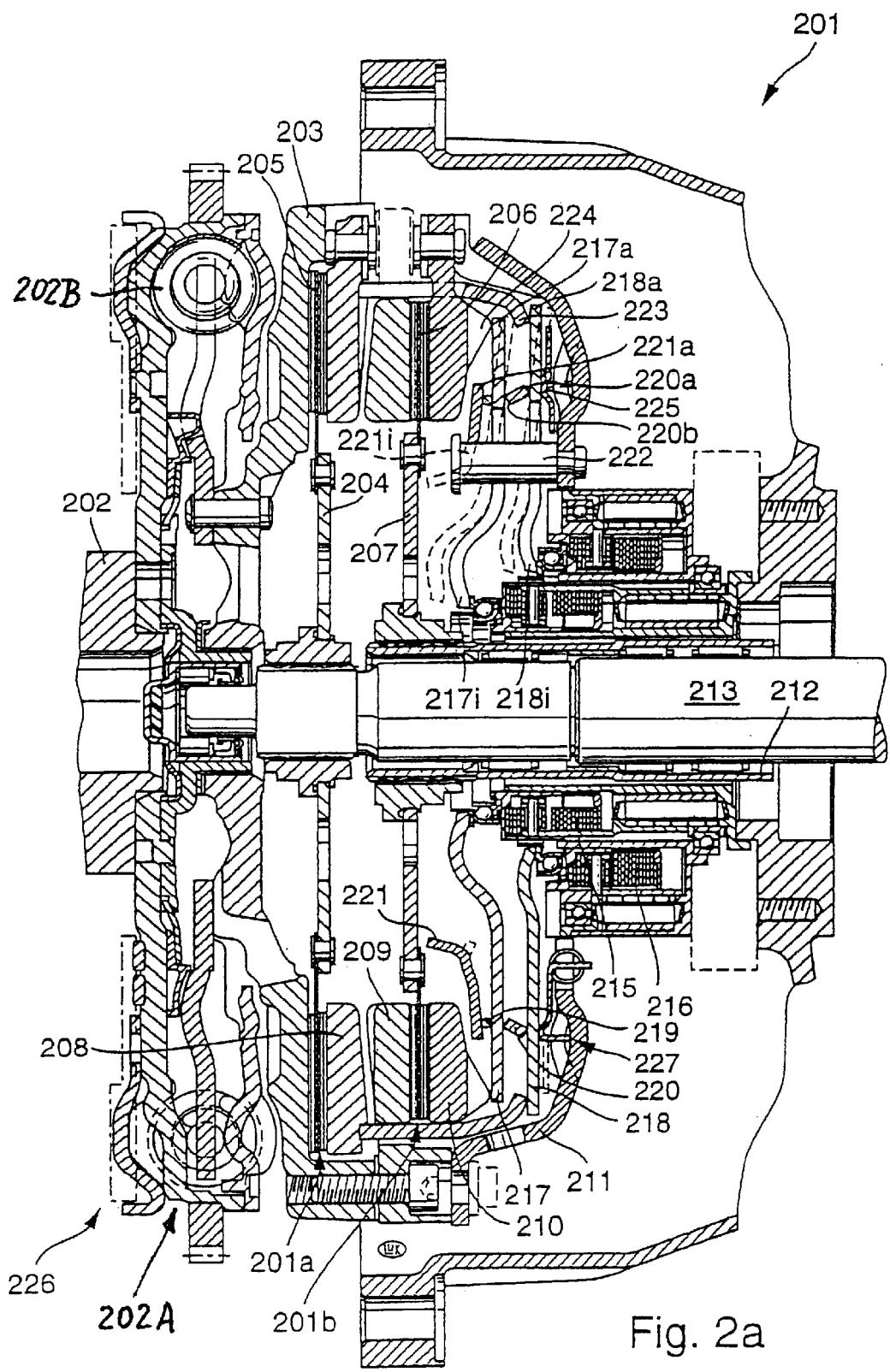
FIG. 2a is an enlarged axial sectional view of the clutch assembly.

FIG. 2a illustrates the details of a clutch assembly 201 which comprises two discrete friction clutches 201a and 201b. The clutch 201a includes a rotary clutch disc or clutch plate 204 having a hub which is connected with a first input shaft 213 of a gearbox corresponding, for example, to the gearbox 6 in the power train of the motor vehicle 1 shown in FIG. 1. When the clutch 201a is at least partially engaged, the clutch disc 204 receives torque from the rotary output element (e.g., a shaft) 202 of a prime mover (such as the camshaft or crankshaft of the engine 2 shown in FIG. 1). The other clutch 201b comprises a clutch disc or clutch plate 207 which is mounted on and can rotate a second input shaft 212 of the gearbox. The clutch disc 207 is driven by the output element 202 of the engine (or another suitable prime mover) when the clutch 201b is at least partially engaged.

The radially outer portion of the clutch disc 204 is provided with friction linings 205 which are disposed between a first pressure plate 203 and a second pressure plate or counterpressure plate 208 of the clutch 201a. The pressure plate 203 can receive torque from the output element 202 of the prime mover by way of a torsional vibration damper 202A. The friction linings 206 at the radially outermost portion of the clutch disc 207 can be engaged by a first pressure plate 209 and a second pressure plate or counterpressure plate 210 of the second clutch 201b.

The first pressure plates 203 and 209 are non-rotatably connected with the output element 202 of the prime mover and are held against axial movement relative thereto. On the other hand, the second pressure plates or counterpressure plates 208 and 210 are non-rotatably but axially movably connected with the output element 202. Suitable means are provided to limit the extent of axial movability (reciprocability) of the second pressure plates 208 and 210 relative to the output element 202. The connections between the second pressure plates 208, 210 on the one hand and the output element 202 on the other hand are established by way of a clutch cover or housing 211 which is non-rotatably affixed to the output element 202 by way of several intermediate parts clearly shown in FIG. 2a. The connection between the first pressure plates 203, 209 and the rotary output element 202 of the prime mover is established by way of a composite input mass 226 which includes the torsional vibration damper 202A. The helical resilient elements (coil springs) 202B of the damper 202A permit for limited angular movements of the two discrete flywheels or masses of the composite input mass 226 relative to each other.

Engagement of the first friction clutch 201a involves an axial displacement of the pressure plate 208 toward the pressure plate 203 so that the friction linings 204 are clamped between the parts 203, 208, i.e., the output element 202 is then capable of transmitting torque to the input shaft 213 of the gearbox. The magnitude of such torque depends upon the extent of frictional engagement between the friction linings 205 of the clutch disc 204 on the one hand, and the pressure plates 203, 208 on the other hand. When the friction clutch 201a is fully engaged, the RPM of the input shaft 213 equals that of the output element 202 of the prime mover.

The friction clutch 201b is engageable in response to axial shifting of the second pressure plate 210 toward the pressure plate 209 so that the friction linings 205 transmit torque to the clutch disc 207 which, in turn, rotates the input element 212. Here, again, the magnitude of the torque being transmitted from the output element 202 of the prime mover to the input element 212 of the gearbox depends upon the extent of frictional engagement between the linings 205 on the one hand, and the adjacent surfaces of the pressure plates 209, 210 on the other hand.

The means for moving the second pressure plate 208 axially of the parts 202, 204, 207, 212, 213 relative to the corresponding first pressure plate 203 comprises a drive 216 here shown as a motor cooperating with an actuating element 218 shown in FIG. 2a as a Belleville spring or diaphragm spring. The latter includes an annular array of radially inner portions 218i which are engaged by the drive 216 and an intermediate portion which is tiltable relative to a fulcrum 220a defined by an annular distancing element 220. The diaphragm spring 218 is tiltable at 220a whenever its radially inner portion or portions 218i is or are axially displaced by the drive 216. The radially outer portion(s) 218a of this diaphragm spring can move the pressure plate 208 axially toward the pressure plate 203 by way of an intermediate (motion transmitting) member 223 when the drive 216 is caused to actuate the clutch 201a.

The reference character 225 denotes a portion of an automatic wear compensating device 227 which acts upon the diaphragm spring 218 opposite the fulcrum 220a of the distancing element 220. The device 227 compensates or can compensate primarily for wear upon the friction linings.

The diaphragm spring 218 is installed and fulcrumed in such a way that it can bias the pressure plate 208 in a direction to the left, as viewed in FIG. 2a, i.e., in a sense to engage the friction clutch 201a. On the other hand, the drive 216 is installed and arranged to be actuatable in a sense to disengage the friction clutch 201a, i.e., to overcome or counteract the bias of the diaphragm spring 218 upon the pressure plate 208; the latter then moves axially and away from the pressure plate 203 in order to reduce the extent of frictional engagement between the friction linings 205 on the one hand, and the pressure plates 203, 208 on the other hand, or to terminate such frictional engagement if the friction clutch 201a is to be fully disengaged.

The clutch 201b is actuatable by a second drive 215. This drive can tilt an actuating device here shown as a Belleville spring or diaphragm spring 217 which, in turn, can move axially (toward the axially fixed pressure plate 209) the axially movable pressure plate 210. The diaphragm spring 217 is tiltable relative to an annular fulcrum 219 and its radially outer portion(s) 217a can displace the pressure plate 210 toward the pressure plate 209 in order to engage the friction linings 206 of the clutch disc 207 with the adjacent surfaces of the parts 209, 210. A second portion 220b of the distancing element 220 engages the diaphragm spring 217 opposite the fulcrum 219.

The drive 215 engages the radially inner portion or portions 217i of the diaphragm spring 217. The annular intermediate part 219 establishes for the diaphragm spring 217 a fulcrum, i.e., the spring 217 is tiltable at 219 to thus increase or reduce its conicity. The radially outer portion(s) 217a of the diaphragm spring 217 abuts or abut the adjacent portions (such as projections) 224 provided at the respective (right-hand) side of the pressure plate 210.

The diaphragm spring 217 tends to move the pressure plate 210 in a direction to the left, as viewed in FIG. 2a, i.e., it tends to engage the clutch 201b. On the other hand, the drive 215 can be actuated to disengage the clutch 201b against the opposition of the diaphragm spring 217, i.e., to move the pressure plate 210 axially and away from the pressure plate 209.

The annular fulcrum 219 abuts the radially outer-most portion(s) of a function element 221 shown in the form of a diaphragm spring or Belleville spring. The portion(s) 221a has or have limited freedom of axial movement and the radially inner portion(s) 221i of the function element 221 is or are affixed to the clutch cover 211 by an annular array of suitable fasteners 222. The fasteners 222 which are shown in FIG. 2a constitute rivets.

When the friction clutch 201a and/or 201b is actuated, the diaphragm springs 217 and 218 are respectively tilted relative to the fulcrum 219 and the portion 220a of the annular distancing element 220. The fulcrum 219 transmits forces to the radially outer portion 221a of the diaphragm spring 221; the bias or force of this spring is then balanced by the forces which are being applied to the fulcra for the diaphragm springs 217 and 218 when the clutch 201a and/or 201b is being actuated.

The wear upon the friction linings 205 and/or 206 of the respective clutches 201a, 201b causes changes in the configurations (extents of conicity) of the diaphragm spring 217 and/or 218. This entails a change of those positions of the paths for the diaphragm springs which are covered when the respective clutches 201a, 201b are being actuated. Depending upon their characteristic curves, the actuating forces of the diaphragm springs 217, 218 increase. The axial force which is being applied to the radially outer region or portion 221a of the function element or diaphragm spring 221 increases whereby the portion 221a yields in the axial direction to an extent which is proportional to the increase of the actuating force. This ensures that the range of action of the diaphragm springs 217, 218 (i.e., the characteristic curve) again corresponds (at least substantially) to that during the initial stage of use of the friction linings 205 and 206, i.e., the balance of forces is restored in a fully automatic way.

The clearance or space between the diaphragm spring 218 and the clutch cover 211 increases in response to yielding of the portion 221a of the diaphragm spring 221. The wear compensating device 227 is adapted to cause its portions 225 to move to an extent corresponding to that of the portion 221a of the diaphragm spring 221; such movement is interrupted by self-locking action when the extent of compensation (i.e., the extent of movement of the portions 225) matches the extent of wear upon the friction linings 205 and 206.

The present application incorporates by reference the disclosures of commonly owned German patent applications Serial Nos. 42 39 291.8-12, 100 11 412.1, 100 13 576.5 and 100 15 205.8, as well as the disclosures of all applications which claim the priority or priorities of one or more of the just enumerated applications.

Attention is especially invited to the aforementioned German patent application Ser. No. 42 39 291.)8-12 which discloses a wear compensating device corresponding substantially to the device 227 of FIG. 2a in the present application and relying on the principle of adjustment with a balancing of forces between a function element corresponding to the part 221, i.e., a sensor constituted by a diaphragm spring, and the forces which arise or develop during actuation of the clutches. Reference should be had particularly to FIGS. 1, 3, 4, 5, 6, 7, 7a, 8, 9, 10, 11, 12, 14, 18, 19, 20 and 25 of the aforementioned German patent application Serial No. 42 39 291.8-12 as well as to those parts of the specification which describe the just enumerated Figures. It is to be borne in mind that, in the embodiment which is shown in FIG. 2a of the present application, the actuating forces generated by the diaphragm springs 217 and 218 act upon the function element 221 which necessitates a corresponding arrangement of all elements that participate in the adjustment necessary to compensate for wear upon the friction linings.

At least one of the illustrated-clutches 201a, 201b can be replaced with a pull-type clutch. Furthermore, the forces which are generated by the diaphragm spring 217 and/or 218 can be utilized to disengage the respective clutch 201a and/or 201b, i.e., the drive 250 and/or 270 is then utilized to exert a pull and to thus engage the corresponding clutch. All that is necessary is to connect the drive 250 and/or 270 with the respective diaphragm spring 217 and/or 218 in a manner to ensure that the drive can pull selected portions of the respective diaphragm spring.

Still further, it is possible to design the clutch assembly 201 in such a way that its diaphragm spring 217 and/or 218 can be moved in a sense to engage and/or disengage the respective friction clutch 201a and/or 201b under the combined action of the drive and one or more resilient elements. The arrangement can be such that the spring or springs furnishes or furnish between 0° and 100° of the required clutch engaging and/or disengaging force. Such mode of operation can be resorted to in connection with pull-type as well as in conjunction with push-type clutches.

It is also possible to employ a forcibly regulated friction clutch 201a and/or 201b, i.e., to omit the diaphragm spring (s) and to rely upon one or more motors in order to engage as well as to disengage the one and/or the other clutch. In other words, at least one of the drives 215, 216 can be replaced with a drive which can engage as well as disengage the respective clutch without the assistance from one or more resilient means. All that is normally necessary is to provide a suitable connection between a mobile part of the drive and the respective diaphragm spring; such connection should be capable of transmitting to the diaphragm spring a pulling force as well as a pushing force, and the connection can be designed and installed to merely carry out reciprocatory (back and forth) movements or combined axial and angular movements.

Figure 2B:
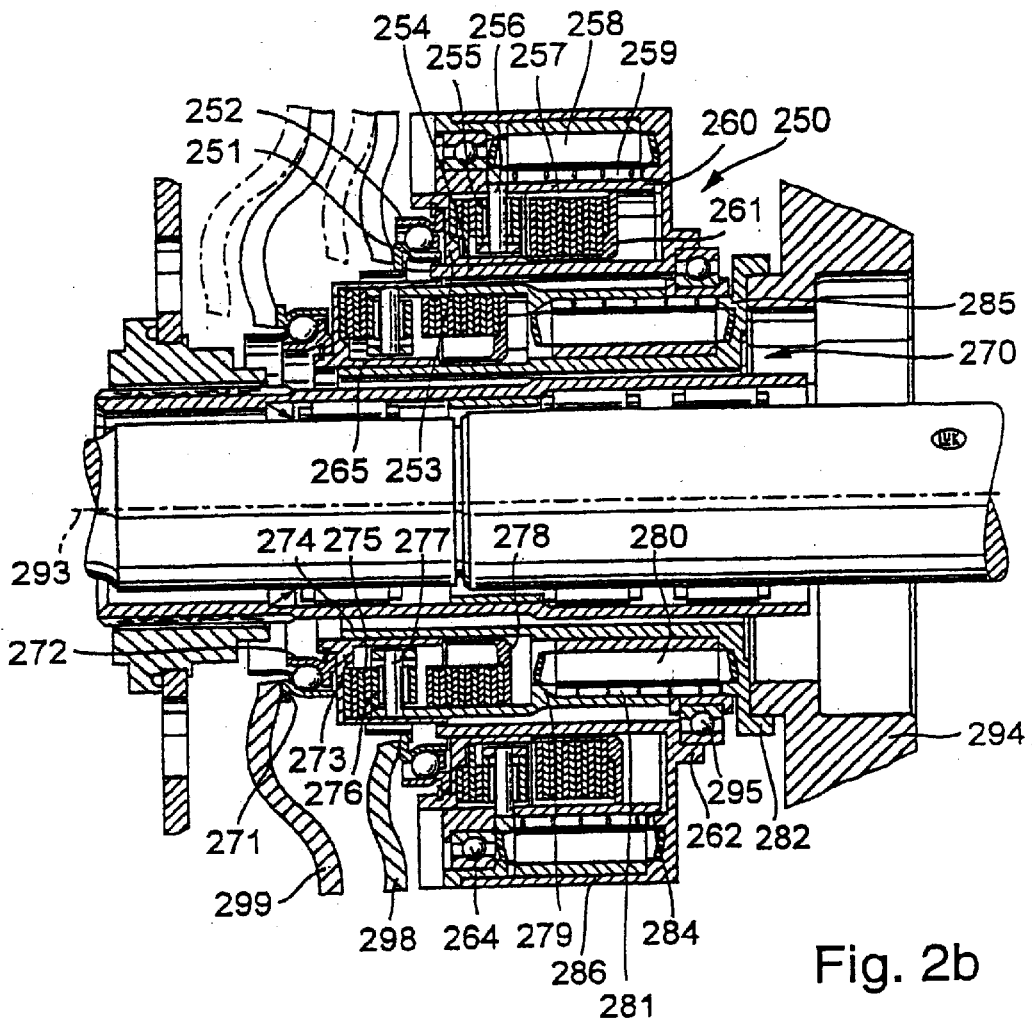

FIG. 2b shows the details of two presently preferred drives or motors which can be utilized in the improved clutch assembly to disengage the respective discrete clutches (such as the clutches 201a, 201b of FIG. 2a). The diaphragm springs 298, 299 in the structure of FIG. 2b correspond to the diaphragm springs 217, 218 in the clutch assembly 201 of FIG. 2a.

The drives 250, 270 act as rotating motors. The drive 250 is a multipole internal rotor motor, and the drive 270 is a multipole external rotor motor. The latter includes a stator 280 which is non-rotatably affixed to a flange-like holder 282 having a sleeve-like extension 274. For example, the stator 280 can be a press fit on the holder 282. This holder is borne primarily by the housing or case 294 of the gearbox; however, it is also possible to mount the holder 282 on the housing (e.g., a bell-shaped housing, not shown) of the clutch assembly.

The drive 250 comprises a stator 258 which is non-rotatably mounted on the radially outer sleeve-like extension 286 of a flange-like holder 262. The latter further includes a radially inner sleeve-like extension 254. The stator 258 can be a press fit on the extension 286. The holder 262 is preferably or primarily mounted on a grooved ball bearing 295 which is connected to a rotary sleeve 279.

The rotor 259 of the drive 250 is mounted on a grooved ball bearing 264 so that it can turn relative to the associated stator 258. In the embodiment of FIG. 2b, the rotor 259 is directly mounted in and is rotatable relative to its housing 260.

In order to ensure that the stator 258 is exactly concentric with the rotor 259, there is provided a seat 284 which is axially spaced apart from the bearing 264 and serves as a friction bearing. However, it is equally possible to provide the seat 284 with a needle bearing or with a ball bearing. The grooved ball bearing 264 and the seat 284 render it possible to establish and maintain a predetermined (optimum) radial play between the rotor 259 and the stator 258 of the drive 250. Furthermore, the bearing 264 and the seat 284 can be arranged to serve as a means for preventing the penetration of contaminants between the stator 258 and the rotor 259.

It is desirable and advantageous to provide the bearing 264 with at least one axial seal which can serve as a means for even more reliably preventing the penetration of dust and/or other impurities into the space between the rotor 259 and the stator 258 and/or into the bearing 264 and/or into the seat 284.

The rotor 281 can turn relative to the stator 280 of the drive 270 on a friction bearing 285 and a second bearing 265 which is axially spaced apart from the bearing 285. Each of the illustrated bearings 265, 285 can be replaced with a needle bearing or ball bearing. These bearings ensure the establishment and retention of a predetermined clearance or play between the stator 280 and the rotor 281 of the drive 270. Furthermore, and as already explained with reference to the bearings 264, 284, the bearing 265 and/or 285 can also perform the additional task of preventing the penetration or of reducing the likelihood of penetration of contaminants into the space between the stator 280 and the rotor 281 of the drive 270.

The drive 250 includes a helically convoluted elastic strip 257 which is received in a ring-shaped recess or pocket or compartment defined by a radially extending part or wall 253 of the drive 250 and by a second radially extending part or wall 261 which latter is spaced apart from the wall 253, as seen in the axial direction of the drive 250. The drive 270 also includes a helically convoluted elastic strip 275 which is received in a ring-shaped space or pocket or chamber between the axially spaced apart parts or walls 273 and 278 of this drive. The strips 257, 275 are respectively engaged by pins 256 and 277 with the interposition of needle bearings 255 and 276. The pins 256 are attached to the rotor 259 of the drive 250, and the pins 277 are affixed to the rotor 281 of the drive 270. When the drive 250 and/or 270 is on, the pins 256 and/or 277 orbit about the common axis 293 of the two drives. This causes the helically convoluted strips 257, 275 to move axially and to thus enable the drives 250, 270 to perform their respective functions.

The part 253 of the drive 250 and the part 273 of the drive 270 include flange-like portions which are respectively adjacent the diaphragm springs 299 and 298 corresponding to the diaphragm springs 217, 218 shown in FIG. 2a. The flange-like portions of the parts 253, 273 respectively carry non-rotating bearing rings 252, 272 which form part of disengaging bearings. These disengaging bearings further comprise rotary bearing rings 251, 271 which are respectively connected with the diaphragm springs 298 and 299.

The second drive 270 is coaxial with and is surrounded by the first drive 250. Furthermore, the axial length of the drive 270 exceeds that of the drive 250; this is accomplished primarily in that the helical band 275 and the stator 280 (and hence the rotor 281) are disposed one behind the other (as seen in the direction of the axis 293). On the other hand, the helical band 257 is surrounded by the stator 258 and the rotor 259 of the drive 250. The rotor 259 surrounds the band 257 and is surrounded by the stator 258. The axial positions of the drives 250 and 270 relative to each other are selected in such a way that their central portions (as seen in the direction of the axis 293) are located in or close to a common plane normal to the axis 293. However, it is also possible to mount the drives 250, 270 in such a way that their ends which are adjacent the case 294 of the gearbox are disposed in a common plane or at least close to each other.

In the drive 250, the stator 258 surrounds (i.e., is located radially outwardly of) the rotor 259. On the other hand, the stator 280 of the drive 270 is disposed radially inwardly of the rotor 281. The wirings and other standard constituents of the drives 250 and 270 shown in FIG. 2b have been omitted for the sake of clarity.

It is further within the scope of the present invention to design the drive 250 in such a way that its helical band 257 and the stator 258 and/or the rotor 259 are disposed behind each other, as seen in the direction of the axis 293. Thus, the arrangement of the parts 257, 258, 259 can be the same as or analogous to that of the parts 275, 280, 281 of the drive 270. In the thus modified drive 250, the stator 258 and/or the rotor 259 is adjacent to or confronts the case 294 of the gearbox; this contributes to a reduction of the outer diameter of the entire arrangement including the two friction clutches and the drives for their diaphragm springs 298, 299.

It is also within the purview of the present invention to interfit the helical band 275, the stator 280 and the rotor 281 of the drive 270 in order to reduce the axial length of the arrangement including the two friction clutches and the drives 250, 270.

Still further, it is possible to interfit the parts of the two drives 250, 270 in such a way that the bands 257 and 275, the stator 258 and/or 280 and/or the rotor 259 and/or 281 are confined within each other; it is then advisable to cause one of the bands 257, 275 to surround the other hand with sufficient radial clearance to provide room for the two stators and the two rotors between the two bands. The just described embodiment can be further modified by employing a single stator which is common to the two drives; a first rotor is then mounted to surround the single stator and to be surrounded by the outer helical band, and a second rotor is installed within the single stator to surround the radially inner helical band. The connections to the source of electrical energy are then designed to ensure predictable operation of the two drives having a common stator.

It is also possible to provide brakes which are designed to ensure that the one and/or the other rotor is braked or maintained at a standstill, when necessary. The single brake and/or the two discrete brakes can constitute electromagnetically actuated or electromagnetic braking means.

Reference may be had particularly to FIGS. 16–19 of the aforementioned German patent application Serial No. 100 15 205.8; this application describes numerous features which can be utilized with advantage in the structure of FIG. 2a and/or 2b or in an analogous structure.

The self-adjusting friction clutch assembly embodying the features shown in FIGS. 2a and 2b, as well as the aforedescribed numerous modifications of such assembly, constitute but a few embodiments of clutch combinations which can be designed, installed and operated in accordance with the present invention. For example, the diaphragm springs 298, 299 which are actuatable by the electrically operated drives 250, 270 of FIG. 2b can be actuated or operated by discrete standard electric motors or by fluid-operated (such as hydraulic) motors.

Several embodiments of our method of operating the novel clutch assembly will be described with reference to FIGS. 3 to 7. More specifically, the method will be described primarily with reference to a clutch assembly which, the same as the clutch assembly embodying the structure of FIGS. 2a and 2b, is capable of ascertaining the extent of wear upon the discrete friction clutches (such as 201a, 201b) and, when necessary or desirable or advisable, of counteracting or compensating for existing differences in the extent of wear.

When the friction clutch 201a and/or 201b is in use, the developing force acts upon the function element 221 and it is not possible to distinguish between that part of the force which is attributable to the clutch 201a and the remaining part of such force, i.e., that part which is attributable to the clutch 201b. Therefore, it is necessary to ensure that the forces which are generated in response to actuation of the clutches 201a and 201b are identical or at least substantially identical, i.e., that the extent of wear upon the friction linings of the clutch 201a matches or at least adequately approximates that upon the friction linings of the clutch 201b.

If there exists a difference between the extents of wear upon the friction clutches 201a, 201b (primarily upon the friction linings of these clutches), the novel method involves the initialization of a wear balancing or equalizing strategy. This normally entails an increase of the wear upon the (one) discrete clutch which has undergone a less pronounced wear and/or the initialization of a less pronounced wear upon the other discrete clutch (the friction linings of which have undergone less attrition than the friction linings of the one clutch). Otherwise stated, once the difference of wear upon the friction linings 205 and 206 reaches or exceeds a certain value, the improved method ensures that the wear upon the friction linings of the other clutch progresses less rapidly than theretofore.

The block diagram of FIG. 3 illustrates the steps which are being undertaken in order to carry out an initialization of a wear balancing or equalizing strategy based upon the extent of wear. At the outset (see the block 302), there is carried out a calculation of the extent of wear $V_1$ (see the block 303) upon the friction linings of one of the clutches such as 201a and 201b as well as the ascertaining or determination of a value $V_2$ denoting the extent of wear upon the friction linings of the other clutch (see the block 304).

In order to ascertain the values $V_1$ and $V_2$, one can rely upon the (calculated) energy input and/or upon the static evaluation of characteristic curve parameters according to a predetermined wear upon the friction linings.

For example, the energy input into a clutch can be calculated on the basis of the slip of the clutch and/or upon the friction torque of the clutch as well as, if necessary, additionally in dependency upon the temperature of the clutch. The temperature can be measured or, preferably, calculated by means of a temperature model and/or by resorting to a temperature-dependent wear coefficient in accordance with the following equation:

$$V_{rechn} = \int M_{Reib} \cdot n_{Schlupf} \cdot \frac{dV}{dE_{Reib}}(T_{Kupplung}) \cdot dt \quad (1)$$

In this equation:

$V_{rechn}$=calculated or ascertained wear $M_{Reib}$=friction coefficient or moment of the clutch $n_{Schlupf}$=slip RPM of the clutch $dV/dE_{Reib}$=(temperature-dependent) wear coefficient of the friction lining, and $T_{Kupplung}$=clutch temperature.

The friction coefficient $M_{Reib}$ can be ascertained, for example, on the basis of a control curve or it can be ascertained by way of a sensor. The slip RPM $n_{Schlupf}$ is preferably ascertained by resorting to RPM determining devices, for example, to devices which can compare the RPM of the engine 2 with the RPM of the wheels 12 while the gearbox 6 is shifted into a particular (known) speed having a certain ratio, or at a known input RPM of the gearbox.

In order to calculate the wear upon the friction clutches in dependency upon the parameters of the characteristic curve, one can resort to characteristic curve parameters which pertain to the sampling point of the clutch and/or to the maximum friction torque and/or to the actuating force of the clutch. Since the characteristic curve parameters concerning the sampling point of the clutch and the maximum friction torque of the clutch in particular are strongly dependent upon those short-lasting temporary changes of characteristic curve of the torque which changes develop, for example, due to operation-dependent influences such as temperature, energy input, humidity and certain others, it is advisable to carry out a static evaluation. For example, one can resort iteratively to the equation 2.1 for the sampling point or, analogously, for the maximum friction torque (see the equation 2.2). These equations render it possible to calculate a new value on the basis of an actual individual value, and a previously ascertained prior value on the basis of weighting of the respective value. It can also be of advantage to apply other forms of statistic evaluation, for example, an average value determination over a larger number of individual values.

The following are the equations 2.1 and 2.2:

$$TP_{mittel\_neu} = (1 - c_{TP}) \cdot TP_{mittelalt} + c_{TP} \cdot TP_{aktuell} \quad 2.1$$

$$Mr\ max_{mittel\_neu}(1 - C_{Mr\ max}) \cdot Mr\ max_{mittelalt} + c_{Mr\ max} \cdot \mathrm{Mrmax}_{aktuell} \quad 2.2$$

In these equations 2.1 and 2.2:

$TP_{mittel\_neu}$=average sampling point, new value to be calculated $TP_{mittelalt}$=average sampling point, old calculated value $TP_{aktuell}$=average sampling point, actual individual value $C_{TP}$=weighting factor sampling point $Mr\ max_{mittel\_neu}$=average maximal friction torque, new value Mr max$_{mittelalt}$=average maximal friction torque, old value Mr max aktuel=average maximum friction torque, Mr max$_{aktuel}$=actual value, and $C_{Mr\ max}$=weighting factor, maximum friction torque.

An advantage of the resort to equation 2.1 and/or 2.2 is that it requires little storage space because it is very simple. The weighting factors c and/or their reciprocal values 1–c render it possible to achieve a weighting of the influence of the actual individual value upon the new value which is to be calculated in accordance with the factor.

If the calculation of the extent of wear upon the friction linings is carried out by resorting to statistical evaluation of characteristic curve parameters pertaining to the actuating force of the clutch, and if the clutch operating means includes actuators, the calculation can be based upon the maximum actuator speed and/or upon the completed or accomplished actuator work, resp. upon the output taken up by the actuator, for example, by resorting to the equations 3.1 and 3.2.

Since the clutch disengaging force increases with increasing wear upon the friction linings of the clutch so that the actuator takes up more energy, such values can be resorted to for the calculation of the extent of wear.

The maximum actuator speed is preferably applied as an influencing value under circumstances involving rapid disengagement of the clutch through a relatively long distance (preferably from a fully engaged to a fully disengaged condition) so that the corresponding values are available for the calculation. As the wear upon the friction linings of the clutch increases, the magnitude of the opposing force increases and the maximal clutch disengaging speed decreases accordingly. A selective or controlled engagement or disengagement of the clutch for the purpose of ascertaining the required values can be initiated at any time, as long as the gearbox is not shifted into one of the speeds associated with the clutch.

$$v_{Aktor\ max} = \max(v_{Aktor}) \Big|_{t_{Start}}^{t_{Ende}} \qquad 3.1$$

$$E_{Aktor} = \frac{1}{R} \int_{t_{Start}}^{t_{Ende}} PWM^2 \cdot dt \qquad 3.2$$

In the above equations 3.1 and 3.2:

$V_{Aktor\ max}$=maximal actuator speed $E_{Aktor\ max}$=actuator work

PWM=actuator current limited by means of pulse width modulation

Here, again, it is of advantage to resort to the equation 2.1 and/or 2.2 in order to generate an indicative median or average comparison value and to thus ensure that the final result is properly influenced (weighted) by such parameters.

The aforedescribed criteria for the calculation of the extent of wear upon the parts of a clutch are compared with memorized reference values, and the thus obtained intermediate (comparison) values are being resorted to for the calculation of a value which is indicative of the wear upon the friction linings of a clutch disc.

The equation (4) can be resorted to for the purpose of ascertaining the functional relationships. The calculated extent of wear is a function of the aforedescribed criteria by taking into consideration the reference values. As a rule, the relationship is not linear. Therefore, it is of advantage to select, for example, upper limits or to ensure that the individual parameters, such as for example the actuator work, exhibit a pronounced progressive influence.

$$V = f\begin{bmatrix} V_{rech} - V_0; TP_{mittel} - TP_0; Mr\,\text{Max}_{mittel} - Mr\,\text{max}_0; \\ v_{Aktor} - v_{Aktor0}; E_{Aktor} - E_{Aktor0} \end{bmatrix} \qquad 4$$

In this equation (4):

V=extent of wear, and

Index 0=reference value.

The values $V_1$ and $V_2$ of the extent of wear (such values are assumed to have been calculated in a manner as fully described hereinbefore) are compared with each other (see the block 305 in FIG. 3). If the value $V_1$ is greater than $V_2$, the value $V_1$ is compared (see the block 306 in FIG. 3) with a value $V_1$ plus $\Delta V_{Aktivierung}$.

If the value $V_1$ exceeds or matches the aforesaid value $V_1$ plus $\Delta V_{Aktivierung}$, undertakings are then initiated to achieve an approximation or equalization of wear upon the clutches 201a and 201b (see the block 311 in FIG. 3). If the value $V_1$ is less than the sum of the values $V_2$ plus $\Delta V_{Aktivierung}$, it is ascertained (see the block 308 in FIG. 3) whether or not any undertakings to change the wear upon the friction linings of the clutch associated with the value $V_1$ are already in progress and, at the same time, whether the value $V_1$ of wear equals or is less than $V_2$ plus $\Delta V_{Aktivierung}$. If all of the requirements indicated in the block 308 are met, the undertakings to conform the wear upon the clutch associated with the value $V_1$ are terminated. If $V_1$ continues to exceed $V_2$ plus $\Delta V_{Aktivierung}$, then-the present invention provides for an adjustment of the clutch assembly 201 in a manner as represented by the block 315 if the forces acting upon the friction element 221 in response to actuation of the clutch 201a and/or 201b increase to reach a value exceeding the opposing force furnished by the function element 221 (see the block 314).

By proceeding in the above outlined manner, i.e., by resorting to $\Delta V_{Aktivierung}$ and $\Delta V_{Deaktivierung}$, one can define an engagement and disengagement hysteresis to initiate the wear compensation strategies.

An analogous wear compensation strategy is initiated if the extent of wear $V_1$ is less than $V_2$. The clutch which is associated with the value $V_2$ is then controlled in a manner as indicated by the blocks 307, 309, 312 and 313 in the diagram of FIG. 3.

When the aforediscussed prerequisites for an adjustment to compensate for non-anticipated or undesirable progress of wear upon the friction clutches 201a and 201b are satisfied (see particularly the block 314 in FIG. 3), it can be of particular advantage to initiate an adjustment (see the block 315) by the controls in that the two individual clutches are fully disengaged at an appropriate time (for example, when the motor vehicle is at a standstill and/or when the engine RPM is below a certain threshold value—preferably at or below the idling RPM).

For example, an adaptation of wear upon the friction linings of the friction clutch wherein the wear upon the friction linings is less than the wear upon the friction linings of the other clutch can be achieved by resorting to the following undertakings.

As a rule, an equalization of wear (i.e., a reduction of wear upon the (one) friction clutch with friction linings having undergone a more pronounced wear and/or an increase of wear upon the other friction clutch) is achieved in that the friction linings of the other clutch are subjected to greater stresses and/or in that the stresses upon the friction linings of the one clutch are reduced.

For example, when the motor vehicle is set in motion at a partial load, a division or splitting of the required torque flow between the two clutches can be achieved in accordance with (i.e., as a function of) the extent wear upon the friction linings of the two clutches. In a power train which employs a twin-clutch assembly (such as 201), those stages of the gearbox which are associated with the two individual clutches have different speeds or ratios. When the vehicle is started at a partial load, the one and/or the other of the clutches 201a, 201b can be operated in a partly engaged condition (i.e., with a certain amount of slip between the friction linings and the adjacent first and second pressure plates). A regulation is carried out in such a way that the application of energy to the clutch with friction linings having undergone less pronounced wear is more pronounced than the application of energy to the other clutch.

If one resorts to a starting mode or function according to which the extent of engagement of the clutch increases in response to increasing engine RPM, such starting function can be applied simultaneously for both clutches by simultaneous consideration of the weighting factors.

Figure 4A:
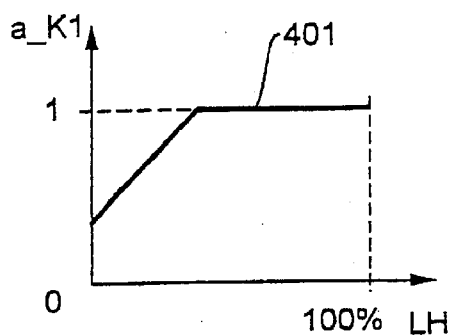
FIG. 4a is a coordinate system wherein the curve denotes a weighting factor for engagement of one of the friction clutches.
Figure 4B:
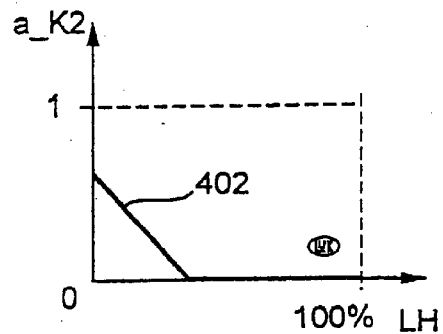
FIG. 4b is a coordinate system wherein the curve denotes the weighting factor for engagement of the other friction clutch.

As shown in FIGS. 4a and 4b, the aforementioned weighting factors are dependent (see the equations 5.1 and 5.2) upon the difference between the extents of wear, upon the extent of slip, and upon the position of the load lever, i.e., upon the required torque as indicated, for example, by the position of the accelerator pedal. In the illustrated embodiment, the clutch 2 has to undergo more pronounced wear and, therefore, the weighting factor (see the curve 401 in the coordinate system of FIG. 4a) increases with progressing depression of the acclerator pedal. On the other hand, the weighting factor (see the curve 402 in the coordinate system of FIG. 4b) for the clutch 2 decreases in response to increasing actuation (depression) of the accelerator pedal, i.e., the clutch 2 is operated with slip for a longer interval of time.

The influence of the weighting factors is felt essentially when the load lever is actuated at 40%, and such influence increases or decreases linearly.

$$M_{r\ Anfahren\ K1} = a_{K1(LH, V_1-V_2, Schlupf)} \cdot f_{Anfahr} \quad 5.1$$

$$M_{r\ Anfahren\ K2} = a_{K2(LH, V_2-V_1, Schlupf)} \cdot f_{Anfahr} \quad 5.2$$

In the above equations:

$M_{r\ Anfahren\ K1}$=clutch torque clutch 1 during starting $a_{K1}$=weighting factor for the clutch 1, see FIGS. 4a and 4b $f_{Anfahr}$=starting function LH=load lever position (torque demand), and ΔV=difference of wear parameters.

FIGS. 4a and 4b do not illustrate the dependency of weighting factors upon the extent of slip. For example, such dependency can be utilized to shift to one of the clutches when the vehicle is set in motion.

In order not to cause arbitrarily developing RPM and/or acceleration behavior as a result of a division of the overall torque flow between the two individual clutches of the illustrated embodiment, the engine torque and/or the engine RPM conforms in dependency upon the distribution of overall torque transmission or flow. If necessary, additional torque may be required, i.e., in addition to that required or selected by the operator of the motor vehicle and/or that selected or required by the control unit.

In the herein discussed embodiment, resort is being had by way of example to the following equations for the weighting factor of the clutch 2:

$$a_{K2} = \frac{i_{K1}}{i_{K2}}(a_{K1} - 1) \quad 6.1$$

$$M_{MotSoll} = M_{MotLH} + a_{K2} \cdot f_{Anfahr} \cdot \frac{i_{K1} - i_{K2}}{i_{K1}} \quad 6.2$$

In the above equations 6.1 and 6.2:

$i_{K1}$=transmission of the shifted-into speed associated with the clutch 1

$m_{MotSoll}$=required engine torque by taking into consideration the additional torque attributable to division of the overall torque $M_{MotLH}$=engine torque as required by the position of the load lever (vehicle operator's desire).

A further possibility to increase the wear upon the friction linings of that one of the clutches wherein such wear is less pronounced than the wear upon the friction linings of the other clutch is to operate the vehicle while the clutches are uninterruptedly operated with slip. The arrangement can be such that, at least for a certain period of time, one of the clutches is operated with slip while the other clutch is fully disengaged (i.e., while the other clutch does not transmit any torque).

Still further, the wear upon one of the clutches can be altered—to ensure that it soon matches or approximates the wear upon the other clutch—in that at least for a certain period of time the one clutch is partly engaged to operate with slip whereas the other clutch is fully engaged to operate without slip and to thus cause the corresponding portion of the power train to transmit the major part of torque (e.g., to the corresponding rotary input element of the gearbox if the improved clutch assembly is installed in the power train of a motor vehicle).

It is particularly advantageous if the method of the present invention is practiced in such a way that, when the motor vehicle is coasting, the (first) clutch with friction linings which have undergone a greater amount of wear is fully engaged (i.e., it operates without slip) while the other or second clutch is engaged in part to operate with slip. At the same time, the gearbox is shifted into a relatively high or very high speed, namely a speed higher than that associated with the first clutch. Such arrangement ensures that the friction linings of the other or second clutch are subjected to more pronounced wear.

An advantage of the just described embodiment is that the prime mover of the motor vehicle need not furnish energy to compensate for unequal wear upon the friction linings of the two clutches. In addition, if and when engaged, the vehicle brake is relieved. In accordance with a further modification, an actuation of the vehicle brake can entail a further (more pronounced) frictional engagement of the friction clutch having friction linings which have undergone less pronounced wear than the friction linings of the other clutch; this results in the achievement of an even more pronounced braking torque and in the transmission of more energy in a sense to accelerate the equalization of wear upon the friction linings of the two clutches.

The aforedescribed mode of operation renders it possible to adjust or select the rate at which the wear upon the friction linings of the two clutches is equalized by making the energy generation dependent upon the extent of slip (slip RPM) and upon the magnitude of transmitted torque.

Figure 5:
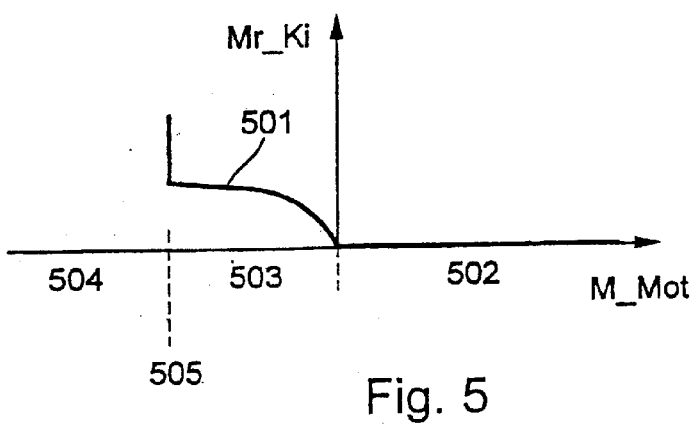
FIG. 5 is a coordinate system wherein the curve denotes the braking torque for compensation of unequal wear upon the friction linings of the clutches.

Equalization of wear upon the friction linings of the two clutches with assistance from the braking torque while the motor vehicle is coasting is illustrated in FIG. 5. The friction torque (denoted by the curve 501) of the clutch which is to be fully engaged (closed) in response to additional energy input is shown in relation to the torque of the prime mover in the power train of a motor vehicle.

The clutch is fully disengaged during an operation with traction (i.e., when the motor vehicle is pulling a load, see the curve 502 in the coordinate system of FIG. 5). However, as soon as the vehicle begins to coast (e.g., while travelling downhill), the clutch is slightly engaged first rapidly and thereupon at a slower rate in response to progressively negative engine torque. When the brake is actuated (as at 505), the clutch is further engaged so that the friction torque of the clutch rises accordingly (within the range 504 in the coordinate system of FIG. 5). The vehicle brake or brakes is or are relieved proportionally with increasing friction torque at the clutch.

It might be advisable to engage the clutch which is to be additionally engaged already at the time when the traction or pulling force is already very small, or during the transition stage from operation with traction to coasting.

Figure 6:
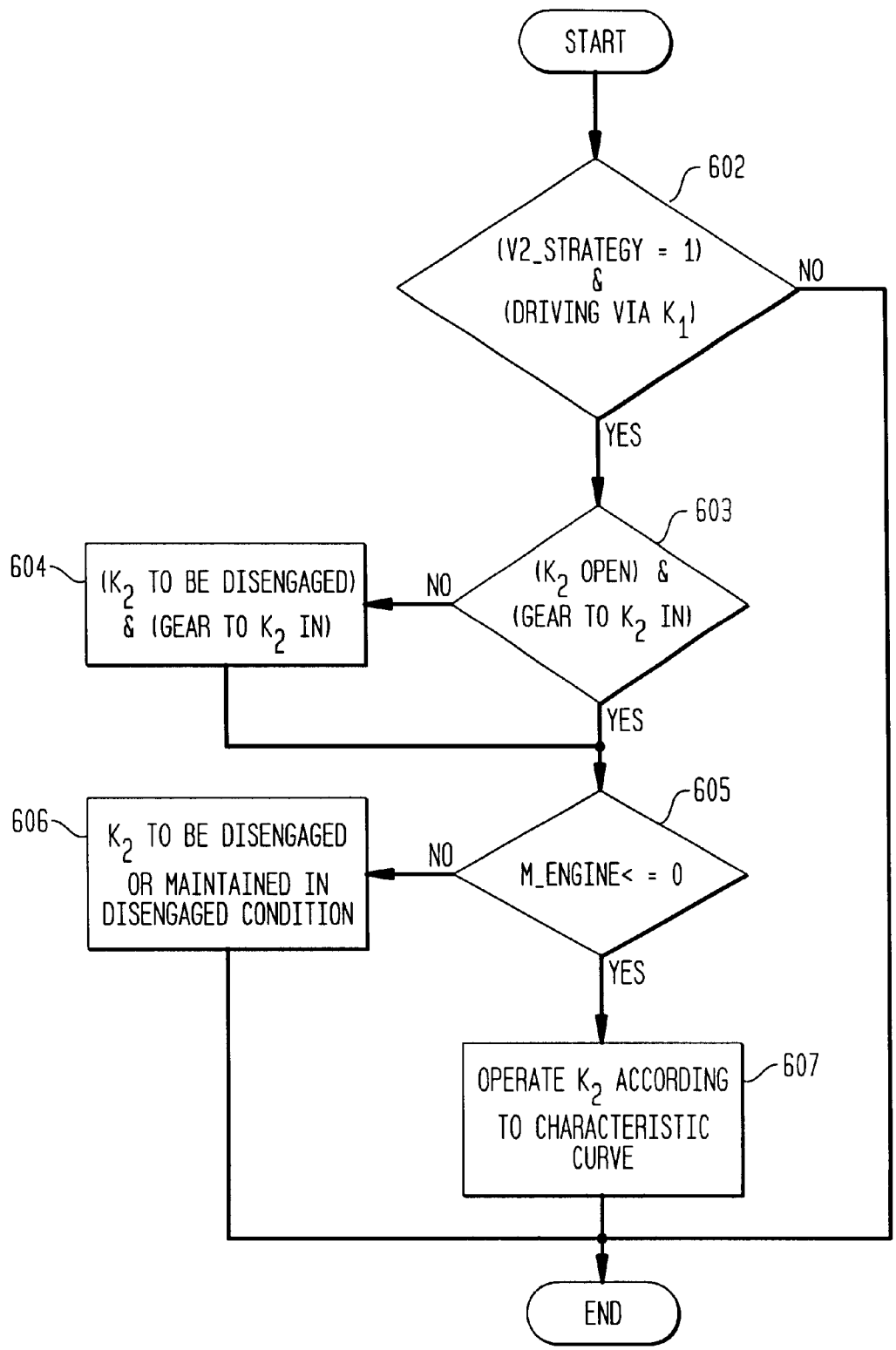
FIG. 6 is a block diagram denoting the steps which are carried out to compensate for unequal wear upon the friction linings of the two clutches while the motor vehicle is coasting.

FIG. 6 illustrates the steps of a method which is being carried out when the wear upon the friction linings of the first clutch (clutch K1) exceeds the wear upon the friction linings of the other clutch (clutch K2), i.e., when the method is to involve a more pronounced wear upon the friction linings of the clutch K2.

It is assumed that the wear upon the friction linings of the clutch K2 is to be increased while the clutch K1 is fully engaged and thus transmits maximum torque to the corresponding input element of the gearbox (see the block 602). It must be ascertained whether the clutch K2 is engaged (block 603) and whether the gearbox is shifted into a speed associated with the clutch K2. If such requirements are met and if the torque being transmitted by the prime mover (such as the engine 2 shown in FIG. 1) equals or is less than zero (i.e., if the motor vehicle is coasting), the clutch K2 is engaged in accordance with the characteristic curve of FIG. 5 (see the block 607 in the diagram of FIG. 6).

If one of the prerequisites represented by the block 603 is not satisfied, the method includes the step of determining (see the block 604) whether or not the clutch K2 is disengaged and whether or not the gearbox is shifted into a speed assigned to the clutch K2; if the answers are in the affirmative, the operation proceeds in a manner as represented by the block 605.

If one of the requirements outlined in the blocks 602 and 605 is not satisfied, the clutch assembly including the clutches K1 and K2 does not perform a compensation for unequal wear. The clutch K2 is separated or remains separated (see the block 606).

If the wear upon one of the clutches is to be increased while the vehicle is coasting, it is preferred to maintain the gearbox shifted into one of the higher speeds because any changes of torque at the input of the gearbox exert a less pronounced influence upon the acceleration of the motor vehicle and the operation, for example, of the clutch must be effected with a relatively low degree of accuracy. Thus, it might be of advantage, for example, to no longer activate the braking assistance when the gearbox is shifted into second speed.

Figure 7:
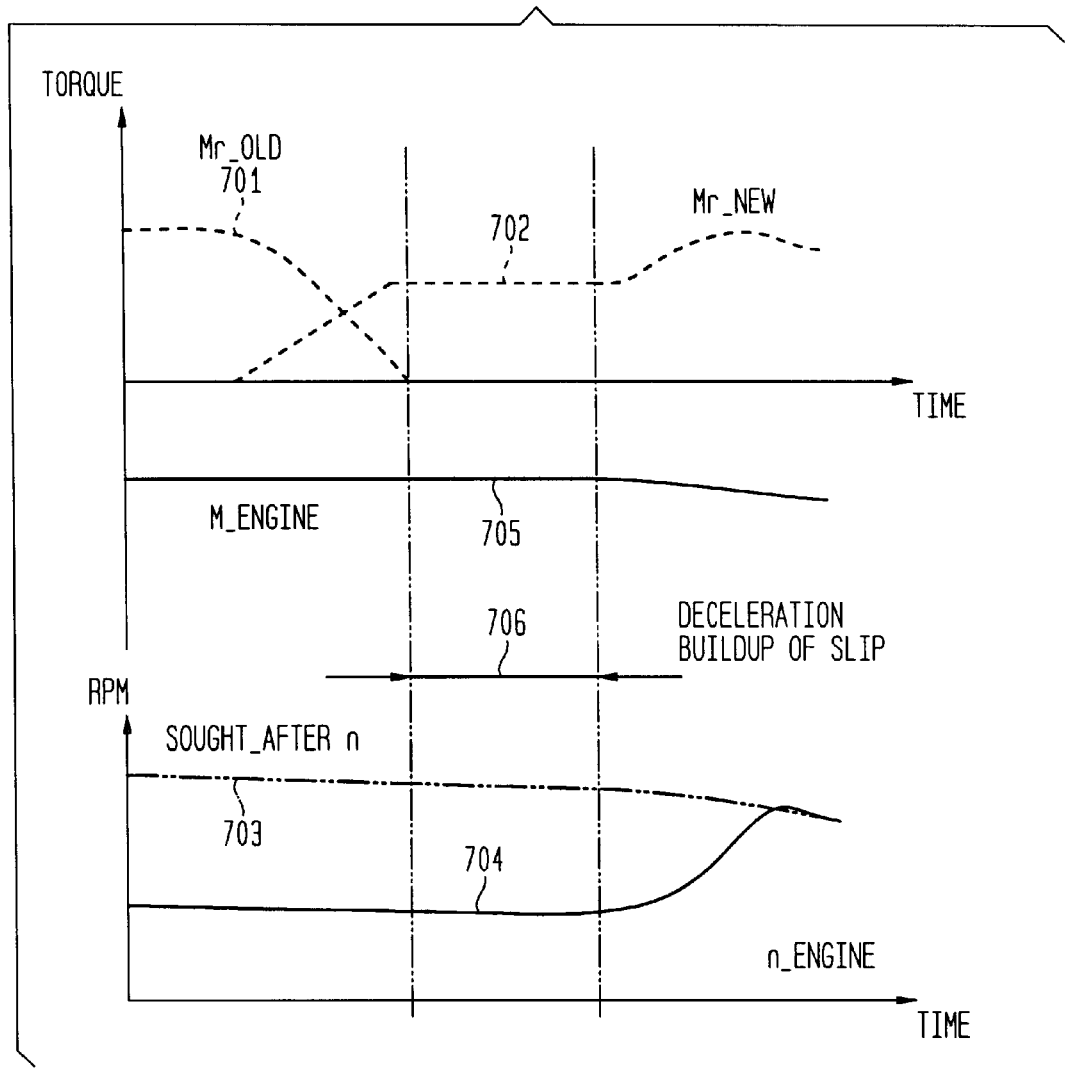
FIG. 7 shows coordinate systems wherein the curves indicate various undertakings concerning the transmission of torque by and the RPM of the rotary output element of the prime mover during certain stages of operation of the motor vehicle.

The procedure in the course of a wear compensating or equalizing strategy during shifting back into coasting mode is illustrated in the coordinate system of FIG. 7. The curve 701 is indicative of friction torque of the (first) clutch associated to the preceding (old) speed of the gearbox. On the other hand, the curve 702 illustrates the friction torque of the (second) clutch associated with the new speed of the gearbox; the friction linings of this clutch have been subjected to wear which is less pronounced than that upon the friction linings of the first clutch. The prime mover torque is denoted by the curve 705. The progress of the RPM of the prime mover is represented by the curve 704, and the curve 703 denotes the desired or sought-after RPM when the gearbox is shifted into new speed.

During backshifting, the engine is brought to a higher new RPM of the new higher-ratio speed. If the friction linings of the clutch for the new speed are to be subjected to additional wear in order to achieve a uniformity of wear upon the friction linings of the two clutches, it can be maintained in the state of operation with slip for a long period of time during the phase or stage 706; this accelerates the wear upon its friction linings.

A more rapid equalization of wear in response to a further increase of energy input to the clutch having friction linings necessitating additional wear (in order to accomplish that the thus achieved wear match or more closely approximate the wear upon the friction linings of the other clutch) can be achieved by a backshift already at higher vehicle speeds or engine RPMs. This entails the development of a higher coasting torque of the prime mover as well as a higher RPM to be synchronized with attendant corresponding increase of energy input into the clutch.

In accordance with an additional feature of the instant invention, it is proposed to utilize the gearbox in conjunction with an electrical machine having a rotor, for example, with a freely rotatable flywheel which is preferably connectable with the prime mover (such as an internal combustion engine) by at least one clutch and is insulatable from a driven unit (such as a gearbox) for the purpose of energy utilization. The motor can constitute the driven unit. Such arrangement can be utilized as a hybrid drive.

In this highly advantageous additional embodiment of the present invention, the gearbox renders it possible to utilize the electrical machine in a number of different ways. By way of example, the electrical machine can be utilized as a starter element or starter unit for the other part of the hybrid drive (such as an internal combustion engine), as a current generator, as a partial drive, as a full drive and also as a unit for conversion of kinetic energy into electrical energy or into kinetic rotational energy with the utilization of the rotor as a flywheel in the course of deceleration procedures of the motor vehicle when the combustion engine is detached (recuperation).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our above outlined contribution to the art of making, assembling and operating multiple-clutch assemblies and, therefore, such adaptations should and are intended to be comprehended within the meaning and range of equivalence of the appended claims.

What is claimed is:

1. A clutch assembly, comprising:
a rotary input member connectable with a rotary output element of a prime mover;
a housing rotatable with said input member;
first and second rotary input elements coaxial with said output element;
first and second clutch discs respectively rotatable with said first and second input elements and having first and second friction linings;
a first pressure plate connected with said output element;

a first counterpressure plate connected with said housing, said first friction linings being disposed between said first pressure plate and said first counterpressure plate;
a second pressure plate rotatable with said housing;
a second counterpressure plate rotatable with said input member, said second friction linings being disposed between said second pressure plate and said second counterpressure plate, said second counterpressure plate being disposed between said second clutch disc and a portion of said housing and said friction linings being subject to wear in actual use of the clutch assembly; and
adjusting means having means for compensating for wear upon at least one of said first and second friction linings.

2. The clutch assembly of claim 1, wherein said first counterpressure plate has limited freedom of axial movement relative to said housing.

3. The clutch assembly of claim 1, wherein said second counterpressure plate has limited freedom of axial movement relative to said housing.

4. The clutch assembly of claim 1, wherein said first pressure plate and said first counterpressure plate constitute component parts of a first friction clutch, said second pressure plate and said second counterpressure plate forming part of a second friction clutch connected in parallel to said first friction clutch.

5. The clutch assembly of claim 1, wherein said first pressure plate and said first counterpressure plate constitute component parts of a first friction clutch, said second pressure plate and said second counterpressure plate forming part of a second friction clutch and further comprising automated means for actuating said first and second friction clutches.

6. The clutch assembly of claim 1, wherein said first pressure plate and said first counterpressure plate form part of a first friction clutch of a twin clutch, said second pressure plate and said second counterpressure plate forming part of a second friction clutch of said twin clutch.

7. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively.

8. The clutch assembly of claim 7, wherein at least one of said actuating means includes at least one of a diaphragm spring and a membrane.

9. The clutch assembly of claim 7, wherein at least one of said actuating means includes a diaphragm spring arranged to normally maintain the respective friction clutch in at least partially engaged condition, said diaphragm spring being deformable to thus allow for disengagement of the respective friction clutch.

10. The clutch assembly of claim 7, wherein one of said actuating means includes a first portion bearing upon one of said counterpressure plates and a second portion, said actuating means further comprising an annular distancing element interposed between said second portion of said one actuating means and the other of said actuating means, one of said first and second portions of said one actuating means being more distant from a common axis of said friction clutches than the other of said first and second portions.

11. The clutch assembly of claim 10, wherein said distancing element has first and second ring-shaped portions having different diameters and respectively abutting said first and second actuating means.

12. The clutch assembly of claim 11, wherein the diameter of said first ring-shaped portion exceeds the diameter of said second ring-shaped portion of said distancing element.

13. The clutch assembly of claim 7, wherein said second actuating means includes a first portion bearing upon the respective counterpressure plate and a second portion, and further comprising a function element and an annular intermediate part interposed between said function element and said second portion of said second actuating means, said second actuating means being tiltable relative to said intermediate part and said function element including one of a diaphragm spring and a membrane.

14. The clutch assembly of claim 7, wherein at least one of said actuating means comprises an elastically deformable annular base and actuating portions extending radially inwardly from said base.

15. The clutch assembly of claim 7, wherein said first and second actuating means have radially inner portions and further comprising first and second drives engaging the radially inner portions of the respective actuating means.

16. The clutch assembly of claim 15, wherein said actuating means have first sides confronting and second sides facing away from the respective clutch discs, said drives being adjacent the second sides of the respective actuating means.

17. The clutch assembly of claim 7, wherein said second actuating means has a first portion bearing upon the respective counterpressure plate and a second portion, and further comprisig a function element and an annular intermediate part interposed between said function element and said second portion of said second actuating means, said second actuating means being tiltable relative to said intermediate part and said function element including one of a diaphragm spring and a membrane, said function element having a radially outer portion and an axially fixed radially inner portion abutting and being tiltable relative to said housing, and further comprising a fulcrum for said second actuating means interposed between said radially outer portion of said function element and said second actuating means.

18. The clutch assembly of claim 7, wherein said second actuating means, includes a first portion bearing upon the respective counterpressure plate and a second portion, and further comprising a function element and an annular intermediate part interposed between said function element and said second portion of said second actuating means, said second actuating means being tiltable relative to said intermediate part and said function element including one of a diaphragm spring and a membrane, said function element forming part of said adjusting means and said adjusting means being arranged to ensure the application of at least substantially constant forces to said counterpressure plates through the medium of said first and second actuating means.

19. The clutch assembly of claim 7, further comprising a function element including a portion constituting a bearing for said second actuating means and being movable axially of said output element in dependency upon the extent of wear upon at least one of said friction linings.

20. The clutch assembly of claim 1, wherein said adjusting means includes means for compensating for wear upon said first and second friction linings.

21. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, a function element, and an annular intermediate part interposed between said function element and a portion of said second actuating means, at least one of said actuating means being operable to generate a first force opposing a supporting force generated in response to the bias of a bearing forming part of said function element and acting upon said second actuating means.

22. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second clutches, respectively, a function element and an annular intermediate part interposed between said function element and a portion of said second actuating means, at least one of said actuating means being arranged to generate a force developing in response to wear upon at least one of said friction linings, said force being applied to said function element and being arranged to increase in response to increasing wear upon said friction linings and exceeding an opposing force generated by said function element.

23. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, and a deformable function element at said actuating means, one of said actuating means being arranged to apply forces to said function element.

24. The clutch assembly of claim 23, wherein said actuating means are arranged to apply to said function element a force which increases with increasing wear upon at least one of said friction linings and to move a portion of said function element in a direction toward said pressure plates, said portion of said function element engaging an intermediate part interposed between said function element and one of said actuating means.

25. The clutch assembly of claim 24, wherein said force decreases in response to movement of said portion of said function element toward said pressure plates.

26. The clutch assembly of claim 24, wherein the moving of said portion of said function element is terminated upon establishment of an equilibrium of forces between the forces for operation of at least one of said actuating means and an opposing force generated by said function element.

27. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, each of said actuating means having a predetermined range of operation and a downwardly sloping characteristic curve which slopes downwardly at least within a portion of the respective range.

28. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, said second actuating means including a first portion which bears upon the respective counterpressure plate and a second portion, and further comprising a function element and an annular intermediate part interposed between said function element and said second portion of said second actuating means, said second actuating means being tiltable relative to said intermediate part and said function element including one of a diaphragm spring and a membrane, said function element being arranged to store energy for the generation of a force which is at least substantially constant within the contemplated range of compensation for wear by said adjusting means.

29. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, and a function element including an axially yieldable diaphragm spring constituting a bearing for a portion of one of said actuating means and being stressed in a direction toward said housing.

30. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, a function element interposed between said housing and one of said actuating means, and an automatic wear compensating device interposed between said housing and at least one of said actuating means.

31. The clutch assembly of claim 30, wherein said wear compensating device includes a portion having a side facing one of said actuating devices, said portion of said wear compensating device being movable axially of said output element toward said pressure plates and being arranged to be arrested against movement away from said pressure plates.

32. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, and an automatic wear compensating device including a portion interposed between said clutch housing and said first actuating means.

33. The clutch assembly of claim 32, wherein said portion of said automatic wear compensating device is arranged to adjust a spring-biased mobile resilient seat for one of said actuating means to an extent corresponding to the extent of movement of at least one of said actuating means as a result of wear upon at least one of said friction linings.

34. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, said wear compensating means including a ring-shaped member which is urged by at least one of said first and second actuating means axially of said output element at least during absence of actuation of the respective friction clutch.

35. The clutch assembly of claim 1, further comprising an automatic wear compensating device including at least one adjusting ramp sloping in the axial direction of said output element.

36. The clutch assembly of claim 35, wherein said at least one ramp is provided on an annular member of said automatic wear compensating device.

37. The clutch assembly of claim 36, further comprising a seat borne by said annular member.

38. The clutch assembly of claim 36, further comprising at least one second ramp cooperating with said at least one adjusting ramp.

39. The clutch assembly of claim 38, wherein said at least one second ramp is provided on a ring which is disposed between said housing and said annular member.

40. The clutch assembly of claim 38, wherein said at least one second ramp forms part of said housing.

41. The clutch assembly of claim 38, wherein said at least one adjusting ramp slopes at an angle of between 5 and 20 degrees, particularly between 8 and 12 degrees.

42. The clutch assembly of claim 38, wherein said ramps frictonally engage each other and have slopes at angles which prevent self-locking by friction.

43. The clutch assembly of claim 38, wherein said at least one second ramp is provided on a ring disposed between said housing and said annular member, and further comprising means for biasing at least one of said ring and said annular member toward the other of said ring and said annular member.

44. The clutch assembly of claim 1, further comprising an automatic wear compensating device which acts as a freewheel in the direction of disengagement of at least one of first and second engageable and disengageable friction clutches the first of which includes said first clutch disc, said first pressure plate and said first counterpressure plate and the second of which includes said second clutch disc; said second pressure plate and said second counterpressure plate, said wear compensating device being self locking in a direction counter to said direction of disengagement.

45. The clutch assembly of claim 1, further comprising an automatic wear compensating device including at least one mobile adjusting portion.

46. The clutch assembly of claim 1, further comprising an automatic wear compensating device arranged to carry out wear compensation as a function of changes of RPM of at least one rotary part of said assembly.

47. The clutch assembly of claim 1, further comprising an automatic wear compensating device arranged to be deactivated at at least one predetermined speed of at least one rotary part of said assembly.

48. The clutch assembly of claim 47, wherein said automatic wear compensating device is arranged to be blocked at rotational speeds of said at least one rotary part above 1000 RPM.

49. The clutch assembly of claim 1, wherein said output element forms part of a prime mover in the power train of a motor vhicle, and further comprising an automatic wear compensating device which is operative at RPMs of at least one rotary part of the prime mover during idling and at RPMs below the idling RPM.

50. The clutch assembly of claim 1, wherein said output element forms part of a prime mover in the power train of a motor vehicle, and further comprising an automatic wear compensating device which is activatable at substantially zero RPM of a rotary part of said power train.

51. The clutch assembly of claim 1, further comprising an automatic wear compensating device having a first support for at least one first ramp, a second support for at least one second ramp abutting and movable relative to said first ramp in the axial direction of said output element, and means for biasing one of said supports toward the other of said supports.

52. The clutch assembly of claim 51, wherein said biasing means is arranged to turn said one support relative to said other support.

53. The clutch assembly of claim 1, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, and a function element constituting a bearing for one of said actuating means.

54. The clutch assembly of claim 1, wherein at least one of said friction linings includes first and second sections and resilient means between said sections.

55. The clutch assembly of claim 54, wherein said first pressure plate and said first counterpressure plate form part of a first engageable and disengageable friction clutch, said second pressure plate and said second counterpressure plate forming part of a second engageable and disengageable friction clutch, and further comprising discrete first and second actuating means for said first and second friction clutches, respectively, said resilient means having a distance-force characteristic at least approximating the distance-force characteristic of the force exerted by said first and second actuating means upon the respective pressure plates.

56. A method of actuating an assembly comprising a plurality of clutch discs having friction linings which are subject to wear, particularly when utilized in the power train of a motor vehicle to transmit torque from a rotary output element of a prime mover to discrete input elements of a gearbox, and wherein the wear upon the friction linings is compensated for by adjusting means, comprising the steps of:
monitoring the extent of wear upon at least one of the friction linings; and
influencing the extent of wear upon at least one of the friction linings when the monitored extent of wear exceeds a preselected value.

57. The method of claim 56, wherein said influencing step includes altering the extent of wear upon at least one of the friction linings to ensure that the wear upon any one of the friction linings at least approximates the extent of wear upon each other friction lining.

58. The method of claim 56, wherein said monitoring step includes at least representatively ascertaining the extent of wear upon the at least one friction lining.

59. The method of claim 58, wherein said ascertaining step includes determining the extent of wear upon each of the friction linings.

60. The method of claim 58, wherein said ascertaining step includes measuring the extent of wear upon the at least one friction lining.

61. The method of claim 58, wherein said ascertaining step includes calculating the extent of wear upon the at least one friction lining.

62. The method of claim 61, wherein said calculating step includes determining the extent of wear upon the at least one friction lining on the basis of calculated energy input of the respective friction clutch.

63. The method of claim 62 of actuating an assembly comprising a plurality of engageable and disengageble friction clutches each of which includes one of the friction linings and at least one of which is operable with slip in a partly engaged condition thereof, said energy input being a function of the RPM of the at least one clutch during operation with slip.

64. The method of claim 62, wherein the calculated energy input is a function at least of friction torque of the respective friction clutch.

65. The method of claim 62, wherein the calculated energy input is a function at least of a coefficient of wear.

66. The method of claim 65, wherein the coefficient of wear is a function of temperature.

67. The method of claim 65, wherein each clutch disc forms part of a discrete friction clutch and said coefficient of wear is a function of the temperature of at least one of the clutches.

68. The method of claim 67, further comprising the step of monitoring the temperature of the at least one clutch.

69. The method of claim 68, wherein said step of monitoring the temperature of the at least one clutch includes measuring the temperature with a temperature model.

70. The method of claim 61, wherein said calculating step includes ascertaining the extent of wear upon the friction linings by way of statistical evaluation of parameters of characteristic curves.

71. The method of claim 70, wherein each clutch disc forms part of a discrete friction clutch and said parameters pertain to the measuring points of the respective friction clutches.

72. The method of claim 70, wherein at least one of said parameters relates to the maximum friction torque of one of the friction clutches each of which includes one of the friction linings.

73. The method of claim 70, wherein at least one of said parameters relates to the maximum actuating force of one of a plurality of friction clutches each of which includes one of the clutch discs.

74. The method of claim 73, wherein the calculating of actuating force of at least one of the friction clutches is dependent at least upon the maximal speed of an actuator for the at least one friction clutch.

75. The method of claim 73, wherein the maximum actuating force of the at least one friction clutch depends at least upon the work of the actuator for the at least one friction clutch.

76. The method of claim 70, wherein said ascertaining step is not appreciably affected by short-lasting influences.

77. The method of claim 76, wherein the calculation of a new value is calculated iteratively on the basis of an actual value and a previously determined value with attendant weighting of the respective values.

78. The method of claim 76, wherein the calculation of a new value involves an averaging of several previously ascertained values.

79. The method of claim 61, further comprising the steps of comparing the values which serve as a basis for the calculating step with reference values, and utilizing the results of the comparing step to establish a function which is at least representative of the extent of wear upon at least one of the friction linings.

80. The method of claim 56, wherein said influencing step includes adjusting the assembly when the averaged values of individual values of the extent of wear upon the at least one friction lining reach a preselected value.

81. The method of claim 80, further comprising the step of actualizing, if necessary, at least some of the reference values upon completion of the adjusting step and as a function of the characteristics of the friction clutch including the at least one friction lining.

82. The method of claim 56, wherein said monitoring step includes ascertaining the extent of wear upon each of the friction linings, and further comprising the step of comparing the extents of wear upon the friction linings prior to said influencing step.

83. The method of claim 82, further comprising the step of memorizing the results of said comparing step.

84. The method of claim 83, wherein said influencing step includes altering the wear upon at least one of the friction linings when the comparing step indicates a predetermined difference between said extents of wear upon the friction linings.

85. The method of claim 84, wherein said altering step includes at least one of (a) increasing the extent of wear upon the friction lining which has undergone less wear and (b) reducing the extent of wear upon the friction lining which has undergone more pronounced wear.

86. The method of claim 85 of actuating an assembly wherein the clutch discs form part of discrete friction clutches serving to transmit torque in the power train of the motor vehicle, wherein the transmission of torque by the clutches is varied in dependency upon the extent of wear upon the respective friction linings.

87. The method of claim 86 of actuating an assembly wherein the friction clutches transmit torque to a gearbox having a plurality of speeds some of which are associated with each of the clutches, further comprising the step of shifting the gearbox into a speed associated with that friction clutch which is to vary the transmission of torque in dependency upon the extent of wear upon the respective friction lining.

88. The method of claim 85 of actuating an assembly wherein the clutch discs form part of discrete engageable and disengageable friction clutches serving to transmit torque between a prime mover and a gearbox in the power train of the motor vehicle and wherein an output element of the prime mover is rotatable at a plurality of different speeds, further comprising the additional step of increasing the extent of engagement of at least one of the clutches in response to increasing speed of the output element.

89. The method of claim 88, wherein said additional step includes increasing the extents of engagement of the clutches at different rates in response to increasing speed of the output element.

90. The method of claim 88, wherein said additional step includes increasing the extent of engagement of the at least one clutch at a rate dependent upon the position of a multiple-position load lever for the friction clutches with weighting factors corresponding to the extent of wear upon the friction linings.

91. The method of claim 85 of actuating an assembly wherein each of the friction linings forms part of a discrete engageable and disengageable torque transmitting friction clutch, wherein said altering step further includes at least temporarily operating with slip that clutch the friction lining of which has undergone less pronounced wear and disengaging the clutch the friction lining of which has undergone more pronounced wear.

92. The method of claim 85 of actuating an assembly wherein each of the friction linings forms part of a discrete engageable and disengageable torque transmitting friction clutch, wherein said altering step further includes at least temporarily operating with slip that clutch the friction lining of which has undergone less pronounced wear and at least temporarily operating without slip that clutch the friction lining of which has undergone more pronounced wear.

93. The method of claim 85 of actuating an assembly wherein each of the friction linings forms part of a discrete engageable and disengageable torque transmitting friction clutch, wherein said altering step further includes engaging that clutch the friction lining of which has undergone less pronounced wear, particularly during coasting of the motor vehicle.

94. The method of claim 93 of actuating an assembly wherein the clutches form part of the power train of the motor vehicle to transmit torque between the rotary output element of the prime mover and the input elements of a gearbox having a plurality of different speeds including speeds associated with one of the clutches and speeds associated with another of the clutches, wherein said influencing step includes shifting the gearbox into a higher speed associated with the clutch the friction lining of which has undergone less pronounced wear.

95. The method of claim 94, further comprising the step of increasing, in response to the application of a brake of the motor vehicle, the extent of torque transmission by the clutch the friction lining of which has undergone less pronounced wear.

96. A method of reducing the likelihood of damage to an automatically operable clutch assembly including a plurality of friction clutches with friction linings which undergo wear in actual use of the assembly in the power train of a motor vehicle further having means for compensating for wear upon the friction linings, comprising:
 a first step of ascertaining the extent of wear upon the friction linings as a result of unintentional slip of the clutches; and
 a second step of carrying out undertakings to at least reduce the extent of unintentional additional slip of the clutches.

97. The method of claim 96, wherein said second step includes limiting the extent of energy input to the clutch assembly in response to unintentional slip of at least one of the clutches.

98. The method of claim 97, wherein said limiting step includes throttling at least one of the variables including (a) the transmission of torque by the prime mover which is connected with the clutch assembly in the power train of the motor vehicle, and (b) the RPM of a rotary element of the prime mover.

99. The method of claim 97, wherein said limiting step includes limiting the extent of slip of the friction clutches constituting component parts of the clutch assembly.

100. A clutch assembly, comprising:
 a rotary input member connectable with a rotary output element of a prime mover;
 a housing rotatable with said input member;
 first and second rotary input elements coaxial with said output element;
 first and second friction clutches each including a pressure plate, a counterpressure plate and a clutch disc disposed between said plates and having friction linings subject to wear in actual use of the respective clutch, the clutch discs of said first and second clutches being rotatable with said first and second input elements, respectively, the pressure plate of said first clutch being connected to said output element and the counterpressure plate of said first clutch being connected with said housing, the pressure plate of said second clutch being rotatable with said housing and the counterpressure plate of said second clutch being rotatable with said input member and being disposed between the clutch disc of said second clutch and said housing;
 control means for automatically actuating said clutches; and
 means for at least reducing the likelihood of damage to said clutches including means for compensating for wear upon at least one of said first and second friction linings.

* * * * *

UNITED STATES PATENT AND TRADEMARK OFFICE
CERTIFICATE OF CORRECTION

PATENT NO. : 6,729,456 B2
DATED : May 4, 2004
INVENTOR(S) : Sebastien Beneton et al.

It is certified that error appears in the above-identified patent and that said Letters Patent is hereby corrected as shown below:

Title page,
Item [75], Inventors, replace "Christopher" with -- Christoph --.

Signed and Sealed this

Fifteenth Day of February, 2005

JON W. DUDAS
*Director of the United States Patent and Trademark Office*